(12) United States Patent
Lo et al.

(10) Patent No.: US 11,371,929 B2
(45) Date of Patent: Jun. 28, 2022

(54) SYSTEMS, DEVICES AND METHODS FOR THREE-DIMENSIONAL IMAGING OF MOVING PARTICLES

(71) Applicant: The Regents of the University of California, Oakland, CA (US)

(72) Inventors: Yu-Hwa Lo, La Jolla, CA (US); Yuanyuan Han, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/970,304

(22) PCT Filed: Feb. 19, 2019

(86) PCT No.: PCT/US2019/018631
§ 371 (c)(1),
(2) Date: Aug. 14, 2020

(87) PCT Pub. No.: WO2019/161406
PCT Pub. Date: Aug. 22, 2019

(65) Prior Publication Data
US 2021/0156788 A1 May 27, 2021

Related U.S. Application Data

(60) Provisional application No. 62/710,576, filed on Feb. 16, 2018.

(51) Int. Cl.
*H04N 13/254* (2018.01)
*G01N 15/14* (2006.01)
*G01N 15/10* (2006.01)

(52) U.S. Cl.
CPC ....... *G01N 15/1475* (2013.01); *G01N 15/147* (2013.01); *H04N 13/254* (2018.05);
(Continued)

(58) Field of Classification Search
CPC . G01N 15/1475; G01N 15/147; H04N 13/254
(Continued)

(56) References Cited

U.S. PATENT DOCUMENTS 9,778,164 B2 10/2017 Lo et al.
2002/0001069 A1 1/2002 Price
(Continued)

FOREIGN PATENT DOCUMENTS

EP 3144662 A1 9/2016

OTHER PUBLICATIONS

ISA, International Search Report and Written Opinion for International Application No. PCT/US2019/018631. dated May 1, 2019. 7 pages.
(Continued)

*Primary Examiner* — Nguyen T Truong
(74) *Attorney, Agent, or Firm* — Perkins Coie LLP

(57) ABSTRACT

Disclosed are methods, devices, systems and applications for camera-less, high-throughput three-dimensional imaging of particles in motion. In some aspects, a system includes a particle motion device to allow particles to move along a travel path; an optical illumination system to produce an asymmetric illumination area of light in a region of the travel path of a particle that scans over a plurality of sections of the particle at multiple time points while the particle is moving; an optical detection system optically interfaced with the particle motion device to obtain optical signal data associated with different parts of the particle corresponding to the particle's volume during motion in the travel path; and a data processing unit to process the optical signal data obtained by the optical detection system and produce data including information indicative of 3D features of the particle.

31 Claims, 22 Drawing Sheets

(52) U.S. Cl.
CPC .......... *G01N 2015/1006* (2013.01); *G01N 2015/145* (2013.01); *G01N 2015/1445* (2013.01)

(58) Field of Classification Search
USPC .......................................................... 348/148
See application file for complete search history.

(56) References Cited

U.S. PATENT DOCUMENTS

| | | |
|---|---|---|
| 2009/0208072 A1 | 8/2009 | Seibel et al. |
| 2010/0238442 A1 | 9/2010 | Heng et al. |
| 2014/0071452 A1 | 3/2014 | Fleischer |

OTHER PUBLICATIONS

Almendro, V. et al. "Cellular Heterogeneity and Molecular Evolution in Cancer" Annu. Rev. Pathol. Mech. Dis. 8, 277-302 (2013).
Altschuler, S. et al. "Cellular heterogeneity: do differences make a difference?" Cell. 141, 559-63 (2010).
Amara, J.F. et al. "Intracellular protein trafficking defects in human disease" Trends Cell Biol. 2, 145-149 (1992).
Barteneva, N.S. et al. "Imaging flow cytometry: coping with heterogeneity in biological systems" J. Histochem. Cytochem. 60, 723-33 (2012).
Basiji, D.A. et al. "Cellular Image Analysis and Imaging by Flow Cytometry" Clin Lab Med. 27, 653-viii (2007).
Chang, J.T. et al. "Asymmetric T Lymphocyte Division in the Initiation of Adaptive Immune Responses" Science. 315, 1187-1191 (2007).
Collins, S.J. et al. "Continuous growth and differentiation of human myeloid leukaemic cells in suspension culture" Nature. 270, 347-349 (1977).
Conchello, J.A. et al. "Optical sectioning microscopy" Nat. Methods. 2, 920-931 (2005).
Dada, O.O. et al. "Simplified sheath flow cuvette design for ultrasensitive laser induced fluorescence detection in capillary electrophoresis" Analyst. 137, 3099-101 (2012).
Dickey, J.S et al. "H2AX: functional roles and potential applications" Chromosoma. 1 18, 683-692 (2009).
Goda, K. et al. "High-throughput single-microparticle imaging flow analyzer" Proc. Natl. Acad. Sci. 109, 11630-11635 (2012).
Gomez-Navarro, N et al. "Protein sorting at the ER-Golgi interface" J. Cell Biol. 215, 769-778 (2016).
Hagiwara, Y. et al. "3D-structured illumination microscopy reveals clustered DNA double-strand break formation in widespread γH2AX foci after high LET heavy-ion particle radiation" Oncotarget. 8, 109370-109381 (2017).
Han, Y. et al. "Imaging Cells in Flow Cytometer Using Spatial-Temporal Transformation" Sci. Rep. 5, 13267 (2015).
Han, Y. et al. "Review: imaging technologies for flow cytometry" Lab Chip. 16, 4639-4647 (2016).
Heath, J.R. et al. "Single-cell analysis tools for drug discovery and development" Nat. Rev. Drug Discov. 15, 204-16 (2016).
Huang, F. et al. "Ultra-High Resolution 3D Imaging of Whole Cells" Cell. 166, 1028-1040 (2016).
Ivashkevich, A et al. "Use of the γ-H2AX assay to monitor DNA damage and repair in translational cancer research" Cancer Lett. 327, 123-133 (2012).
Janssen, A. et al. "Chromosome Segregation Errors as a Cause of DNA Damage and Structural Chromosome Aberrations" Science. 333, 1895-8 (2011).
Kuo, L.J. et al. "γ-H2AX-A Novel Biomarker for DNA Double-strand Breaks." In Vivo 22 (3) 305-309 (2008).
Laerum, O.D. et al. "Clinical application of flow cytometry: A review" Cytometry. 2, 1-13 (1981).
Ling, J.Q. et al. "CTCF mediates interchromosomal colocalization between Igf2/H19 and Wsb1/Nf1" Science. 312, 269-72 (2006).
Liu, P.Y. et al. "Cell refractive index for cell biology and disease diagnosis: past, present and future" Lab Chip. 16, 634-644 (2016).
Mueller, F. et al. "FISH-quant: automatic counting of transcripts in 3D FISH images" Nat. Methods. 10, 277-278 (2013).
Nitta, N. et al. "Intelligent Image-Activated Cell Sorting" Cell. 175, 266-276.e13 (2018).
Olkkonen, V.M. et al. "When intracellular logistics fails—genetic defects in membrane trafficking" J. Cell Sci. 119, 5031-45 (2006).
Ota, S. et al. "Ghost cytometry" Science. 360, 1246-1251 (2018).
Pelkmans, L. "Using Cell-to-Cell Variability—A New Era in Molecular Biology" Science. 336, 425-426 (2012).
Pitrone, P.G. et al. "OpenSPIM: an open-access light-sheet microscopy platform" Nat. Methods. 10, 598-599 (2013).
Roberts, J.P. et al. "Phenotypic Drug Discovery with High Content Screening" (2015), (available at www.perkinelmer.com).
Snijder, B. et al. "Origins of regulated cell-to-cell variability" Nat. Rev. Mol. Cell Biol. 12, 119-125 (2011).
Telford, W.G. et al. "Flow cytometry of fluorescent proteins" Methods. 57, 318-330 (2012).
Zhang, Q. et al. "Quantitative refractive index distribution of single cell by combining phase-shifting interferometry and AFM imaging" Sci. Rep. 7, 2532 (2017).
EPO, Extended European Search Report for European Application No. 19753770.7, dated Oct. 6, 2021. 8 pages.

… (1) …

SYSTEMS, DEVICES AND METHODS FOR THREE-DIMENSIONAL IMAGING OF MOVING PARTICLES

CROSS-REFERENCE TO RELATED APPLICATIONS

This patent document is a national stage application of and claims the benefit of International Application No. PCT/US2019/018631, filed on Feb. 19, 2019, which claims priority to and benefits of U.S. Provisional Patent Application No. 62/710,576 entitled "SYSTEMS, DEVICES AND METHODS FOR THREE-DIMENSIONAL IMAGING FLOW CYTOMETRY" filed on Feb. 16, 2018. The entire content of the aforementioned patent applications are incorporated by reference as part of the disclosure of this patent document.

FEDERALLY SPONSORED RESEARCH OR DEVELOPMENT

This invention was made with government support under DA045460 awarded by the National Institutes of Health. The government has certain rights under the invention.

TECHNICAL FIELD

This patent document relates to techniques and systems for flow cytometry.

BACKGROUND

Flow cytometry is a technique to detect and analyze particles, such as living cells, as they flow through a fluid. For example, a flow cytometer device can be used to characterize physical and biochemical properties of cells and/or biochemical molecules or molecule clusters based on their optical, electrical, acoustic, and/or magnetic responses as they are interrogated by in a serial manner Typically, flow cytometry uses an external light source to interrogate the particles, from which optical signals are detected caused by one or more interactions between the input light and the particles, such as forward scattering, side scattering, and fluorescence. Properties measured by flow cytometry include a particle's relative size, granularity, and/or fluorescence intensity.

SUMMARY

Disclosed are methods, devices, systems and applications that pertain to three-dimensional imaging flow cytometry (3D-IFC).

In some aspects, a system for three-dimensional (3D) imaging of moving particles includes a particle motion device including a substrate to allow particles to move along a travel path in a first direction; an optical illumination system to produce an asymmetric illumination area of light in a region of the travel path of a particle that scans over a plurality of sections of the particle at multiple time points while the particle is moving, the asymmetric illumination area of light including one dimension of illumination thinner than the other dimension of illumination to form a shape like an illumination plane, the optical illumination system including a light source to produce a light beam that is optically coupled to light redirection device to modify the light beam by redirecting the light beam to different angles to have the asymmetric illumination area of light directed at the travel path of particle motion; an optical detection system optically interfaced with the particle motion device and operable to obtain optical signal data associated with different parts of the particle corresponding to the particle's volume during motion in the travel path, in which the optical detection system includes one or more photodetectors and a spatial filter positioned between the particle motion device and the one or more photodetectors, the spatial filter including a plurality of apertures to selectively allow a portion of the asymmetric illumination area of light over a scanned section of the particle to pass through the spatial filter and be detected by the one or more photodetectors; and a data processing unit in communication with the optical detection system, the data processing unit including a processor configured to process the optical signal data obtained by the optical detection system and produce data including information indicative of 3D features of the particle.

In some aspects, a method for three-dimensional (3D) imaging of moving particles includes moving a particle along a first direction; scanning a plurality of sections of the particle, section by section, by directing individual asymmetric illumination areas of light at corresponding regions while the particle is moving; spatially filtering portions of the asymmetric illumination area of light over the scanned sections of the particle in motion to allow certain optical signals corresponding to the particle's volume through a spatial filter to be detected; and detecting the spatially-filtered optical signals to obtain individual voxels in three dimensions mapped to time points of detection.

The subject matter described in this patent document and attached appendices can be implemented in specific ways that provide one or more of the following features.

DETAILED DESCRIPTION

Figure 1A:
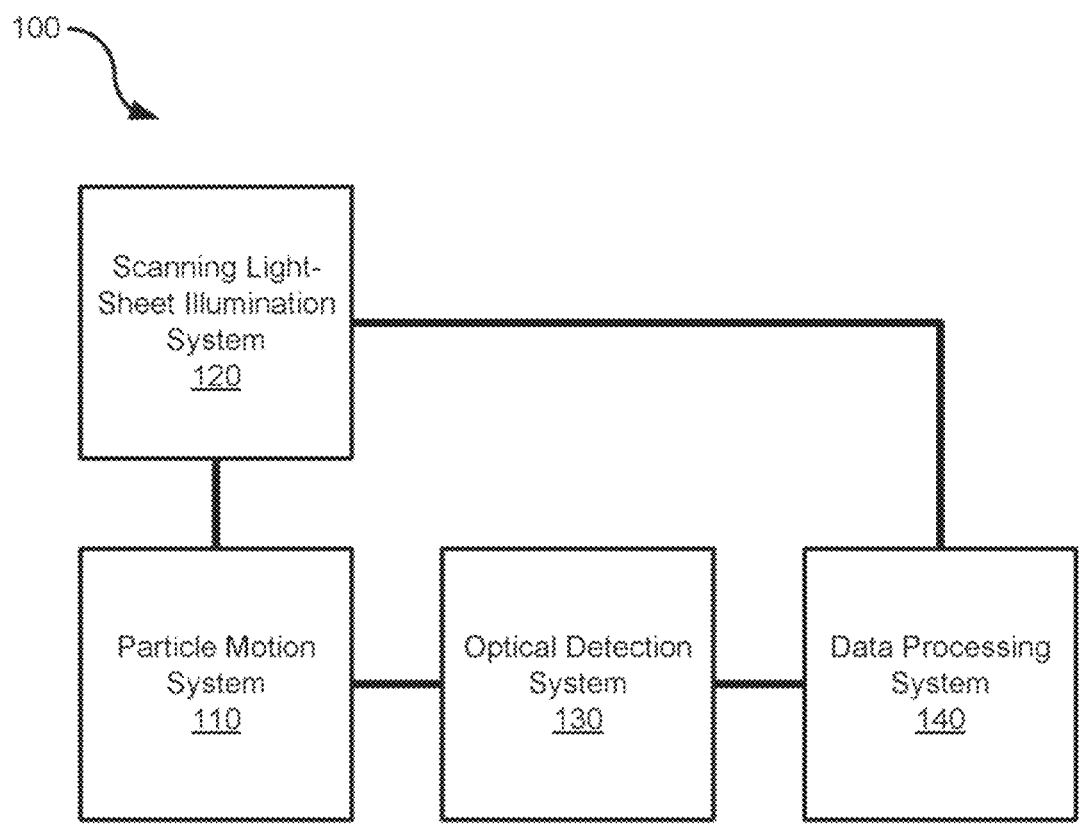
FIG. 1A shows a block diagram of an example embodiment of a three-dimensional imaging flow cytometry (3D-IFC) system in accordance with the present technology.

A central challenge of biology is to correlate the phenotype of heterogeneous individuals in a population to their genotype in order to understand the extent to which they conform to the observed population behavior or stand out as exceptions that drive disease or the ability to become threats to health. While optical microscopy has been a cornerstone method to study the morphology and molecular composition of biological specimens, flow cytometry has been a gold standard for quantitative high-throughput single-cell characterization in numerous biomedical applications. Conventional imaging flow cytometry (IFC) is a technique that merges some aspects of optical imaging with flow cytometry. For example, IFC can simultaneously produce ensemble-averaged measurements and high-content spatial metrics from individual cells in a large population of cells, without perturbation due to experiment condition change. Yet, an important limitation of existing IFC systems is that, regardless of the optical detection method and computation algorithm is used, only 2D cell images can be obtained. The absence of 3D tomography results in occlusion of objects, blurring by focal depth, loss of z-axis spatial resolution, and artifacts due to projection of a 3D cell into a 2D image. For example, with 2D microscopic imaging, if a fluorescent probe is observed at the center of a cell, its location (e.g. membrane, cytosol, nucleus) is ambiguous. For a range of applications, such as internalization measurements, probe co-localization, and spot counting, relative to 2D imaging that is dependent on the cellular orientation to the imaging plane, 3D images provide more complete and accurate phenotyping of cell and organelle morphology, as well as nucleic acid and protein localization to support biological insights. Thus, there is a need for rapid and continuous 3D image acquisition for single cells in flow.

The demand of continuous, sub-millisecond temporal resolution using fluorescence microscopy remains largely unsatisfied. Imaging cells in flow can quickly perform high-throughput morphology, translocation and cell signaling analysis on a large population of cells. Compared to single-point flow cytometry, three-dimensional imaging flow cytometry (3D-IFC) provides high-content information about 3D spatial distribution of fluorescence and/or scattering light that can be useful for high-throughput rare cell detection and heterogeneous phenomena studies.

Disclosed are methods, devices, systems and applications for camera-less, high-throughput three-dimensional imaging of particles in motion. In some aspects, for example, a three-dimensional imaging flow cytometry (3D-IFC) system is arranged in a light sheet fluorescence microscopy configuration, which illuminates a specimen in a single plane at a time whilst the signal is detected in a perpendicular direction, e.g., through a spatial filter. For example, the 3D-IFC system can include an acousto-optic deflector providing high-speed scanning in the z-direction. For example, the 3D-IFC system can include a single-element photodetector to detect the fluorescence optical signal passed the spatial filter in each signal channel, and a 3D image is reconstructed from the time-domain detector output. The 3D-IFC system integrates the scanning light sheet, the cell's flow motion, and the spatial filter, such that the detector is able to detect an individual point in the cell at a time, which allows space-to-time mapping on a one-to-one basis, so called spatial-to-temporal transformation.

While some of the disclosed embodiments of the systems, methods and devices for three-dimensional imaging of moving particles are described herein primarily for imaging flow cytometry to facilitate understanding of the underlying concepts, it is understood that the disclosed embodiments can also include techniques and systems for moving particles by other means or modalities and be used for other applications.

The disclosed systems, methods and devices are able to map the 3D features of an object in motion (e.g., cell, particle or other object), voxel by voxel, to a temporal signal at the detector output when the cell/particle/object travels through (e.g., by flow, slide, fall, or other mechanism) an optical interrogation zone defined by an optical illumination area, referred to the "light sheet", that is fast scanning In some embodiments, the disclosed systems, methods and devices include a spatial filter/mask that is placed in front of an optical detector to only allow the optical signal generated from a specific volume (e.g., point volume) and at a specific time to reach the detector(s). Signals outside the specific volume or specific time point are blocked by the spatial mask.

FIG. 1A shows a block diagram of an example embodiment of a system for three-dimensional imaging of moving particles, labeled 100, in accordance with the present technology. The system 100 includes a particle motion system 110, a scanning light-sheet illumination system 120 interfaced with the particle motion system 110, an optical detection system 130 interfaced with the particle motion system 110, and a data processing system 140 in communication with the optical detection system 130 and/or scanning light-sheet illumination system 130. In some implementations, the system 100 operates as a single point detector by transforming the optically detected information about the specimen in flow between space and time to construct a three-dimensional image from the transformed information. For example, instead of focusing light on a single spot of the specimen, the illumination system 120 focuses the light along a 2D plane as the specimen is in motion by the particle motion system 110, while the optical detection system 130 detects individual light points from the three-dimensional space around the planarly-illuminated specimen based on a spatial filter map having a pattern that allows only certain portions of the light to pass through to limit certain point signals to enter the detector. This opto-mechanical technique structures light on a three-dimensional object in two dimensions (e.g., a planar "light sheet") while scanning optically-screened one-dimensional points of the planar light sheet while the object is in motion. The system 100 is able to produce 3D cell tomographic images of particles, cells or other moving objects at a fast flow rates (e.g., 10 cm/sec), allowing high-throughput 3D imaging.

In some embodiments of the system 100, the particle motion device 100 includes a substrate that allows particles to move along a travel path in a first direction (e.g., motion direction). The scanning light-sheet illumination system 120 is configured to produce the light sheet in a region of the travel path of a particle that scans over a plurality of sections of the particle at multiple time points while the particle is moving. The produced, scanning light sheet is an asymmetric illumination area of light that includes one dimension of illumination that is thinner than the other dimension of illumination to form a shape like an illumination plane. The scanning light-sheet illumination system 120 includes a light source (e.g., laser) to produce a light beam that is optically coupled to light redirection device to modify the light beam by redirecting the light beam to different angles to have the light sheet directed at the travel path of particle motion. The optical detection system 130 is optically interfaced with the particle motion device 110 and operable to obtain optical signal data associated with different parts of the particle corresponding to the particle's volume during motion in the travel path. The optical detection system 130 includes one or more photodetectors and a spatial filter positioned between the particle motion device 110 and the one or more photodetectors, where the spatial filter include one or more apertures to selectively allow a portion of the asymmetric illumination area of light over a scanned section of the particle to pass through the spatial filter and be detected by the one or more photodetectors. The data processing unit 140 is in communication with the optical detection system 130 (and, in some embodiments, with the scanning light-sheet illumination system 120) and configured to process the optical signal data obtained by the optical detection system 130 and produce data including information indicative of 3D features of the particle.

In some embodiments, the particle motion system 110, sometimes referred to as a "flow cell" in such related embodiments, includes a substrate having a fluidic channel for carrying a fluid sample containing a flow specimen (e.g., particles, living cells, or other objects). In some embodiments, the particle flow cell system includes a flow focusing system to produce a confined sample fluid to a fine stream in the fluidic channel. In some embodiments, the fluidic channel of the flow cell is configured in an interrogation region to be optically transparent, allowing for clear optical paths. The fluid containing the flow specimen flows along a flow direction through the interrogation area in the fluidic channel, where optical data are obtained by the imaging system 120 for each particle, including single particles or single cells.

Yet, in some embodiments, the particle motion system 110 includes a substrate to which one or more particles, cells (or other object for interrogation) are fixed, where the substrate is moved with respect to the scanning light-sheet illumination system 120 and optical detection system 130 such that a particle, cell, etc. is brought into the interrogation region upon which the scanning light sheet is illuminated and from which such light at and/or through the particle, cell, etc. is detectable. In such embodiments, the particle motion system 110 includes a device positioning system including a moving stage (e.g., driven by a motor or other driving device) to move the substrate such that the particle fixed thereon is moved along the travel path and brought into the region upon which the light sheet is scanned, In some embodiments, the scanning light-sheet illumination system 120 includes a light source to generate light that will be structured as the light sheet for illumination on a particle flowing in the fluidic channel of the particle motion system 110. In some embodiments, the light source includes a laser; and/or in some embodiments, the light source includes a high-brightness LED or super-luminescent diode. The illumination system 120 includes a device for redirecting the light beam generated by the light source to different angles, which can be programmed to generate periodic angle change at high speed (e.g., a range of at least 100 kHz to 1 MHz). The light beam redirection device can be optically coupled with passive optical components (e.g., such as a cylindrical lens or other optical components, like a lenses, prisms, or spatial filters) to shape the redirected light and produce the structured light sheet illumination that allows optical sectioning of the particles in motion. For example, the illumination system 120 is operable to illuminate a thin slice or a thin line of the particle at a time, e.g., a scanning light-sheet on the particle.

In some embodiments, for example, the light redirection device includes acousto-optic deflector (AOD) device. For example, the AOD can provide for controllable, high speed changing of the angle of the light beam with high optical efficiency, where the AOD moves the energy of the beam without losing portions of the beam. While the AOD redirects light reliably with high speed and efficiency, it is wavelength sensitive and may not be optimal for some applications where multiple light beams of varying wavelengths are to be employed in the implementation of the system 100.

In addition to or alternative to the AOD, for example, in some embodiments, the light redirection device can include a multiplexed array of scanning mirrors and/or multiplexed array of scanning gratings, which are not wavelength limited. For example, an individual optical component like a scanning mirror would provide scanning speeds of about 20 kHz; but, the multiplexed array of scanning mirrors can be configured to provide high speeds, e.g., 200 kHz.

In some implementations, the optical detection system 130 can be placed at any angle orthogonal to that of the travel path of the particle, cell, etc., e.g., such as normal to a fluidic channel of the particle flow cell that has an optically clear path. In some embodiments, the optical detection system 130 includes a photodetector and a spatial filter positioned at an image plane of the photodetector to selectively allow the light from specific positions of the particle to pass through for detection by the photodetector. The optical detection system 130 is operable to detect 1D optical data points in time of a 3D objection based on combination of (a) flow motion of the particle, (b) a scanning light-sheet illumination, and (c) spatially mapped filter to detect light intensity (e.g., including fluorescence and scattering) from every position of the particle in a sequentially-timed manner. Therefore, the time-domain signal recorded by photodetector(s) of the optical detection system 130 has a one-to-one relation from space to time. In some implementations, the optical detection system 130 includes optical filters in order to collect and detect fluorescence and scattering light. For example, the optical detection system 130 can include a plurality of photodetectors for detecting multiple channels of fluorescence and/or scattering light.

In some embodiments, the spatial filter includes a surface having a plurality of apertures (openings or slits) arranged in a pattern on the surface. In some embodiments, the slits are spaced apart along the first direction of particle motion and a second direction perpendicular to the first, where the position of the adjacent slits varies along the second direction with respect to another slit of the pattern. In some examples, the apertures can be configured in other geometries and shapes, e.g., including but not limited to square, rectangular, trapezoidal, triangular, etc. or other curved shapes including oval, circular, etc. In various embodiments, the size of the apertures can be selected based on the desired resolution of the image data to be constructed from the detectable optical signals. For example, the diameter or length of the aperture can be determined from the magnification strength of the light directed onto the image plane multiplied by the desired resolution. In one example, if the desired resolution is 1 µm and the objective lens of the detection module 170 is 20×, then the slit would be configured to have a 20 µm diameter. Similarly, for example, if the desired resolution is 0.5 µm and the objective lens of the detection module 170 is 50×, then the slit would be configured to have a 25 µm diameter. In some implementations, for example, the relatively smaller apertures (with respect to the particle size) effectively allow the detected light to be processed as a delta function.

The data processing system 140 is configured to process the detected optical signal data and produce data (e.g., a data set) that is indicative of three-dimensional features of the particle, cell, etc. from which a 3D image or density distribution of the particle, cell, etc. can be constructed. For example, the data may represent an optical density distribution in 3D space, which is rather different than 3D images obtained from a conventional 3D imaging modality such as a confocal microscope. In some embodiments, the data processing system 140 includes a data streaming unit in communication with the optical detection system 130. The data processing system 140 can include a processor and memory (data processing unit) to reconstruct 3D image for each particle from the detected optical signal data captured at the optical detection system 130. In some implementations, for example, an image reconstruction algorithm is resident on the data processing unit that includes specifications of illumination and detection protocols and commands the scanning light-sheet illumination system 120 and the optical detection system 130 accordingly. In some embodiments, the data processing system 140 includes an image processing unit to process the image data to determine properties associated with the particle.

Figure 1B:
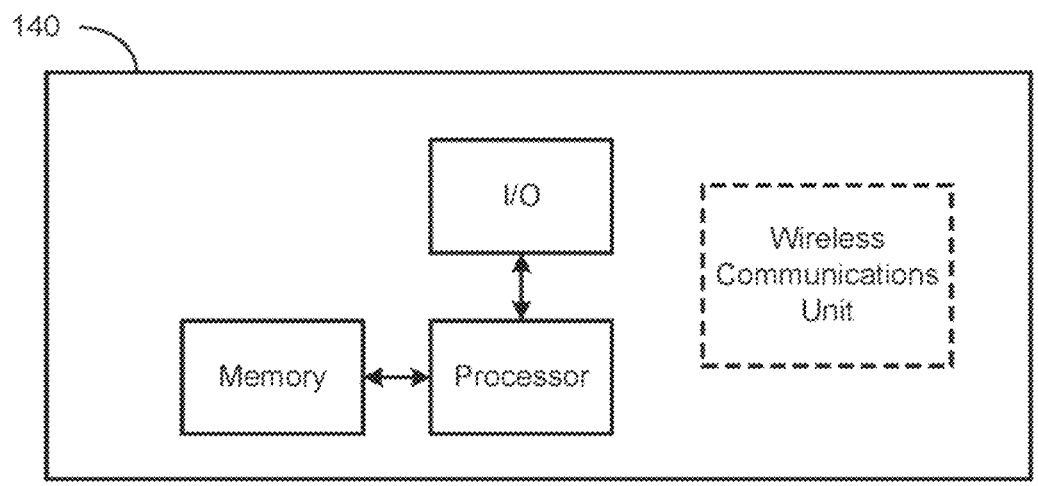
FIG. 1B shows a block diagram of an example embodiment of the data processing system of the 3D-IFC system shown in FIG. 1A.

FIG. 1B shows a block diagram of an example embodiment of the data processing system 140 of the example system 100. In various implementations, the data processing system 140 is embodied on one or more personal computing devices, e.g., including a desktop or laptop computer, one or more computing devices in a computer system or communication network accessible via the Internet (referred to as "the cloud") including servers and/or databases in the cloud, and/or one or more mobile computing devices, such as a smartphone, tablet, or wearable computer device including a smartwatch or smartglasses. The data processing system 140 includes a processor to process data, and memory in communication with the processor to store and/or buffer data. For example, the processor can include a central processing unit (CPU) or a microcontroller unit (MCU). In some implementations, the processor can include a field-programmable gate-array (FPGA) or a graphics processing unit (GPU). For example, the memory can include and store processor-executable code, which when executed by the processor, configures the data processing system 140 to perform various operations, e.g., such as receiving information, commands, and/or data, processing information and data, such as from the system 100, and transmitting or providing processed information/data to another device, such as an actuator or external display. To support various functions of the data processing system 140, the memory can store information and data, such as instructions, software, values, images, and other data processed or referenced by the processor. For example, various types of Random Access Memory (RAM) devices, Read Only Memory (ROM) devices, Flash Memory devices, and other suitable storage media can be used to implement storage functions of the memory. In some implementations, the data processing system 140 includes an input/output (I/O) unit to interface the processor and/or memory to other modules, units or devices. In some embodiments, such as for mobile computing devices, the data processing system 140 includes a wireless communications unit, e.g., such as a transmitter (Tx) or a transmitter/receiver (Tx/Rx) unit. For example, in such embodiments, the I/O unit can interface the processor and memory with the wireless communications unit, e.g., to utilize various types of wireless interfaces compatible with typical data communication standards, which can be used in communications of the data processing system 140 with other devices, e.g., such as between the one or more computers in the cloud and the user device. The data communication standards include, but are not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G cellular communication methods, and parallel interfaces. In some implementations, the data processing system 140 can interface with other devices using a wired connection via the I/O unit. The data processing system 140 can also interface with other external interfaces, sources of data storage, and/or visual or audio display devices, etc. to retrieve and transfer data and information that can be processed by the processor, stored in the memory, or exhibited on an output unit of a display device or an external device.

Figure 1C:
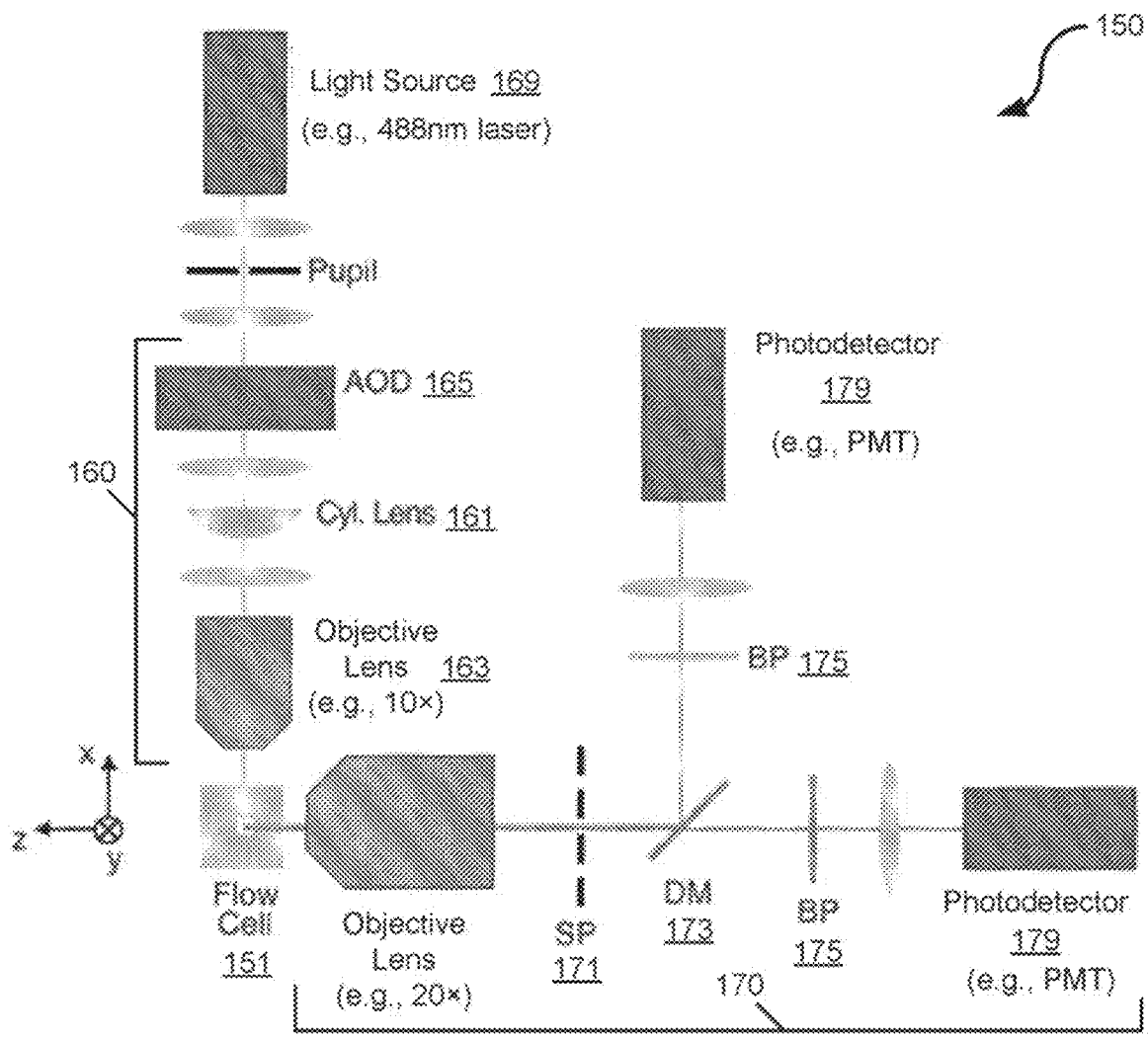
FIG. 1C shows a diagram of an example embodiment of a 3D-IFC system in accordance with the present technology.

FIG. 1C shows a diagram of an example embodiment of a 3D-IFC system 150 in accordance with some embodiments of the system 100. As shown in the diagram, the 3D-IFC system 150 includes a particle flow cell 151 that includes a fluidic channel for carrying a fluid sample containing a flow specimen (e.g., particles, living cells, etc.) that is interfaced to a light sheet illumination module 160 and a detector module 170. The light sheet illumination module 160 includes an acousto-optic deflector (AOD) 165 optically coupled to a cylindrical lens 161 and an objective lens (OL) 163, arranged in an optical illumination path with a light source 169 (e.g., a laser, such as a 488 nm laser). For example, the cylindrical lens 161 is placed after the AOD 165 to focus the light (e.g., make the laser beam focus) in one direction to form a scanning light sheet. The AOD produces deflected first-order beam at a different angle for each frequency and therefore generates scanning over time. The detector module 170, which includes a spatial filter (SP) 171, arranged in an optical detection path between an objective lens 172 interfaced with the flow system 151 and an optical photodetector 179 (e.g., photomultiplier tube (PMT)) to capture the optical signal data from the flow objects (e.g., cells, particles, etc.). In some implementations, a particular light spectral range or ranges of the optical signal data is detected by the detector module 170. As such, in some embodiments like that shown in FIG. 1C, for example, the detector module 170 includes the spatial filter 171 optically coupled to a dichroic mirror (DM) 173 that is optically coupled to a bandpass filter (BP) 175 and the photodetector 179 (e.g., PMT) in split optical paths. For example, the illumination can be done perpendicularly to the detection. The spatial filter 171 is placed at the image plane. In some embodiments, the 3D-IFC system 150 includes lenses or light guides to focus and/or direct light at the designated location of another component of the system. In some implementations, for example, PMT signals are collected, e.g., by 100 Mega samples per second (MS/s) per channel digital recording device.

In some example embodiments, the 3D-IFC system 150 is arranged in a light sheet fluorescence microscopy configuration, which illuminates a flow specimen in a single plane at a time whilst the signal is detected in a perpendicular direction. The acousto-optic deflector (AOD) 165 can provide the high-speed scanning in z-direction. A single-element photodetector, such as PMT 179, detects fluorescence passed the spatial filter 171 in each channel, and an image is reconstructed from the time-domain detector output. Combining the scanning light sheet, the cell's flow motion, and the spatial filter, the detector only detects an individual point in the cell at a time, which allows spatial-to-temporal transformation.

Figure 1D:
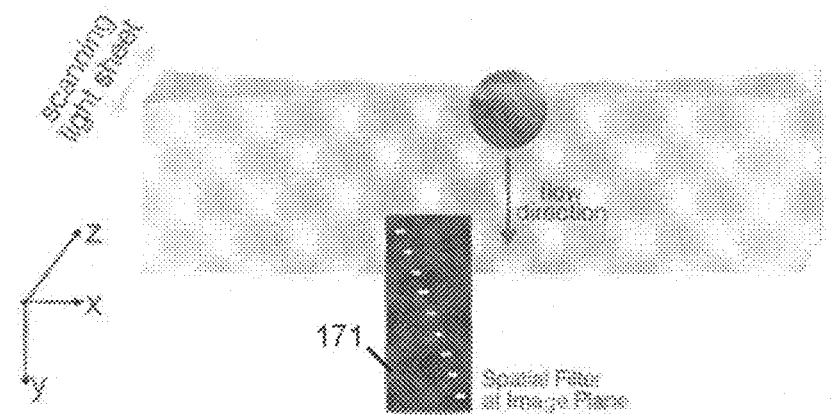
FIG. 1D shows an illustration depicting a cell flowing at the object plane and a spatial filter positioned at image plane from the diagram of FIG. 1C.

FIG. 1D shows an illustration depicting an example flow specimen (e.g., a cell) flowing along the object plane and spatial filter 171 positioned at image plane. In some embodiments, the spatial filter 171 includes a surface having a plurality of apertures (openings) arranged in a pattern, e.g., a slit, where each aperture of the pattern is spaced apart along the y-axis (parallel to the flow direction) and varies in its position along the x-axis (perpendicular to the flow direction) with respect to another aperture of the pattern, such that each aperture along the y-axis is at a different position along the x-axis. In the example spatial filter 171 shown in FIG. 1D, the apertures include slits having a rounded shape (e.g., oval or circular) with a diameter of about 20 µm.

As shown in the diagram, the planar light sheet is created in the x-y plane, where the width of light is defined along the y-axis (the particle flow direction), and where the x-axis is the weight of the light (the direction of illumination). In this diagram, the z-axis is the scanning axis, which is controlled by the AOD 165. In some implementations, the thickness of a light sheet (z-axis) is on the order of about 1 µm. The optical point scanning of the cell is carried out along the y-axis while the cell is in motion in the channel; and the x-axis scanning is accomplished by the spatial filter map 171. In this example, the light sheet produced by the light sheet illumination module 160 has a 0.6 µm waist (z-direction) and 250 µm length in y-direction, scanning in z-direction. The spatial filter has ten 20 µm (x-direction) by 10 µm (y-direction) slits positioned apart in the way of one is immediately after another.

Figure 2A:
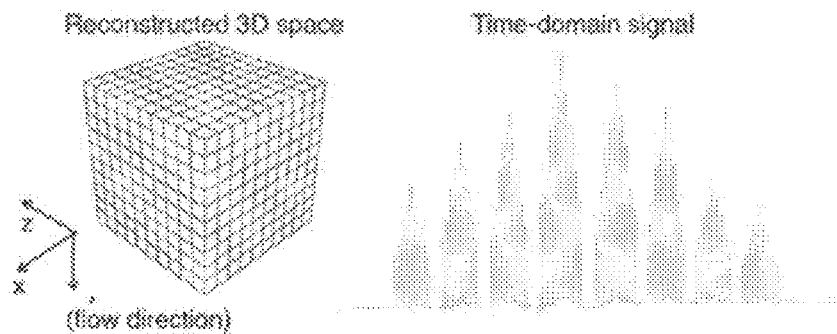
FIG. 2 shows a diagram illustrating the principle of the relation between time-domain signal and spatial information including spatial light intensity.
Figure 2B:
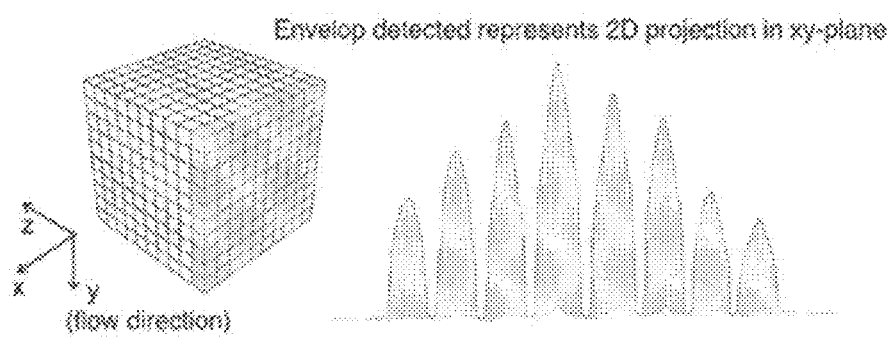
Figure 2C:
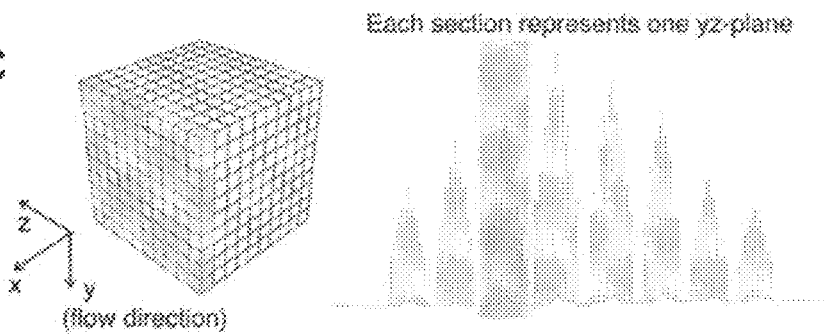
Figure 2D:
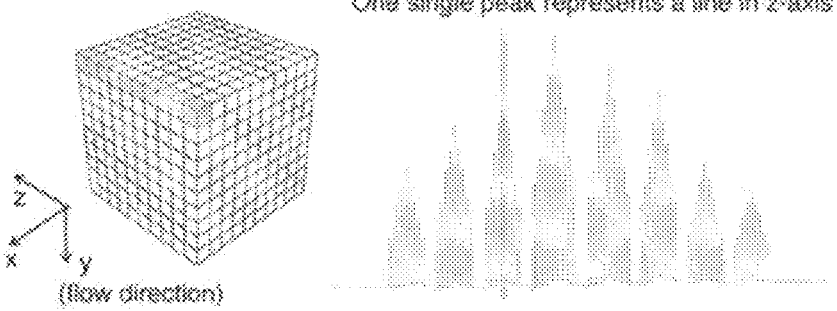

FIGS. 2A-2D show diagrams illustrating a relationship between a time-domain signal (right) and spatial information (left) depicted as a cube in 3D space, showing the spatial light intensity. FIG. 2A shows an example of the time-domain signal from 3D-IFC represents the light intensity of a 3D object (sphere-like in the example); each time-point corresponds to a specific voxel in the 3D space. FIG. 2B shows an example of an envelope of the signal which represents the xy-plane projection of the whole 3D object. FIG. 2C shows an example in which each section as highlighted represents the light intensity of one yz-plane slice of the 3D space. In these examples, the time duration of each section is the time for the object to travel 20 µm in the object plane, which equals to the image passes one slit to another along the spatial filter. FIG. 2D shows an example in which one single peak as highlighted represents the light intensity of one row in z-direction, where the light sheet does one scan period.

The following equations may be used to describe some aspects of the embodiments of the system 100. For example, when the acoustic frequency sent to the acoustic transducer in the acousto-optic deflector (AOD) is changing in a sinusoidal manner, the position of the light sheet in z-direction f (t) can be described as $$f(t\in(0,T/2))=v_1 t$$

$$f(t\in(T/2,T))=2z_0-v_1 t \quad (1)$$

For example, if the acoustic frequency is changing in a sawtooth-wave manner, f(t) can be described as $$f(t)=v_1 t, \quad (2)$$

where T is the scanning period, $v_1$ is the scanning speed in z-direction, $z_0$ is the waist of the light sheet in z-direction.

The light sheet illumination I (x, y, z, t) can be written as $$I(x,y,z,t) = C \cdot e^{-\frac{(z-f(t))^2}{\sigma^2}} \approx C \cdot \delta(z-f(t)) \quad (3)$$

The characteristic function F(x, y) of the spatial filter is designed to be $$F(x,y)=\Sigma_{q=1}^{N}\delta(x-q)\cdot\delta(y-qL), \quad (4)$$

where x=1, 2, . . . , N is the number of slits on the spatial filter, L is the length of the slit in y-direction.

The measured PMT signal S(t) can be expressed as $$S(t)=\int_{x,y,z}\text{Cell}(x,y-Mv_2 t,z)/(x,y,z,t)F(x,y)dxdydz=\int_{x,y}\text{Cell}(x,y-Mv_2 t,f(t))F(x,y)dxdy, \quad (5)$$

where M is the magnification factor of the detection system, Cell(x, y, z) is the 3D cell fluorescence intensity profile.

This example approach maps the 3D cell image into the time-domain light intensity on a one-to-one basis.

Implementations of the example embodiments of the system 100 may be used for imaging and characterizing features of biological samples, such as living cells. For example, single cells may be imaged in suspension flowing at a speed of 0.1 m/s inside a flow-cell cuvette. In example implementations described herein, some single-cell samples that have been imaged include HEK293T cell stained with CellTrace CFSE with 1 µm fluorescence beads bond to its cell membrane.

Figure 3A:
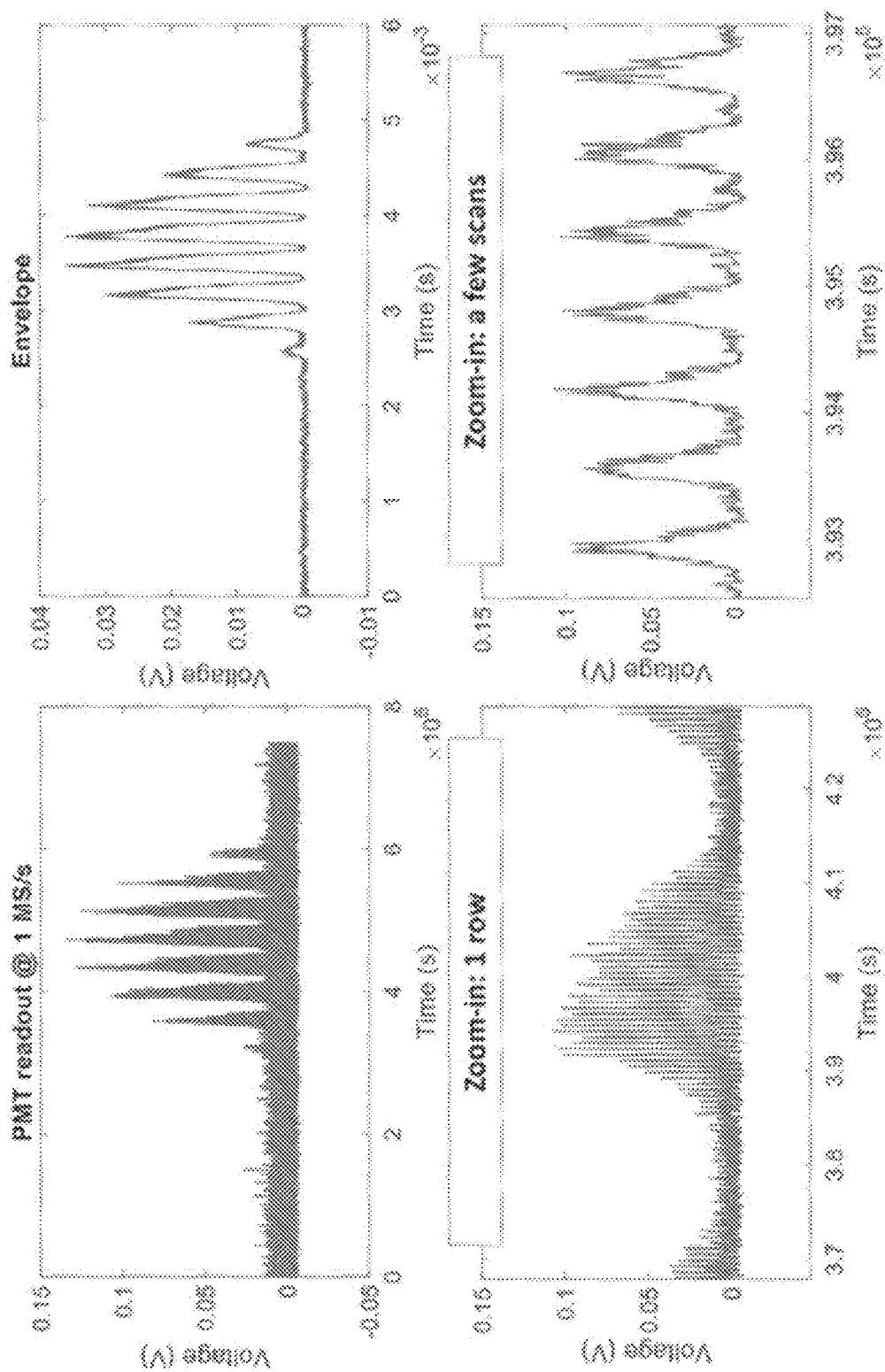
FIGS. 3A and 3B show data plots of time-domain signals from an example 3D-IFC system, in accordance with some example embodiments.
Figure 3B:
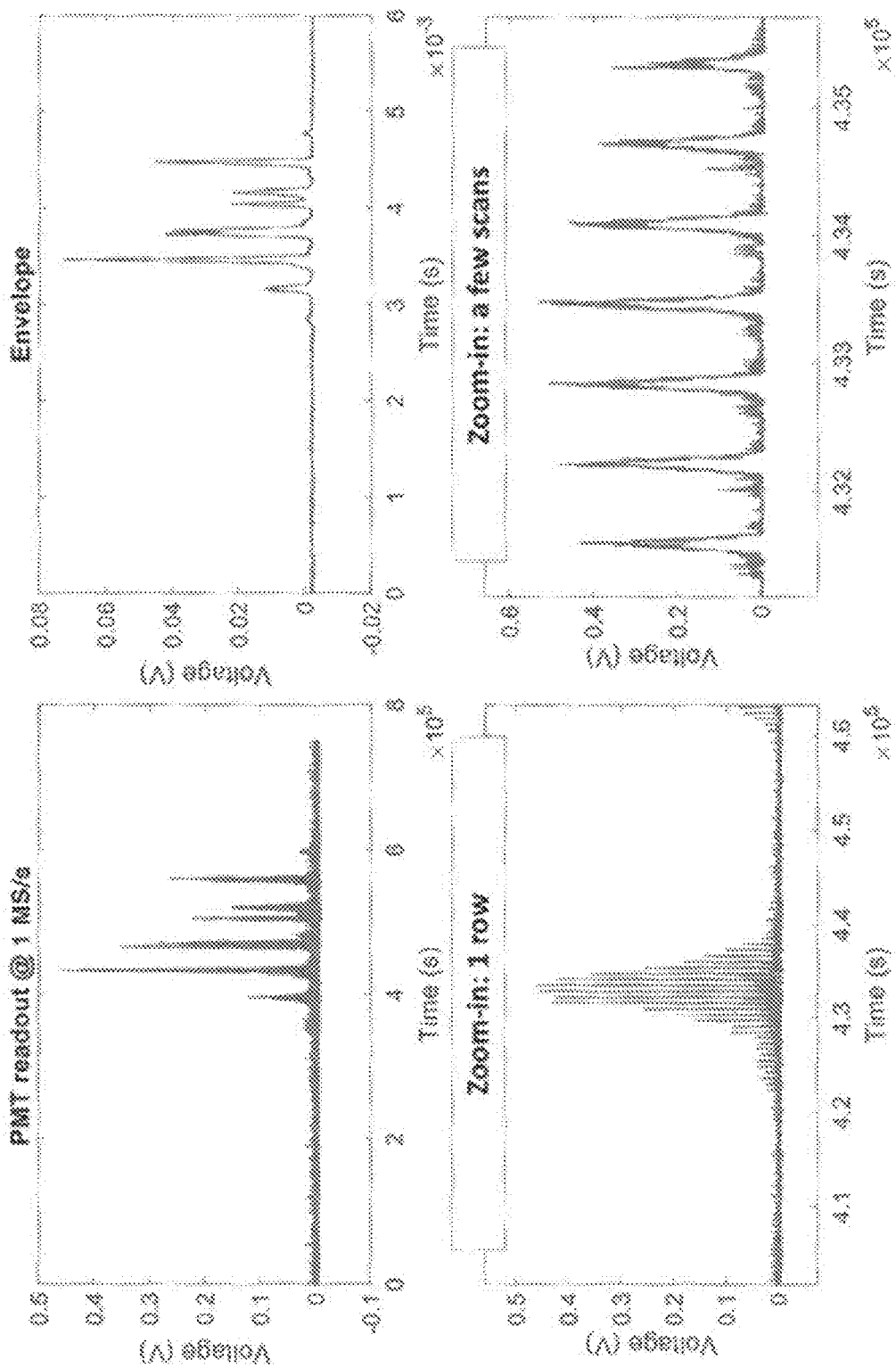

FIGS. 3A and 3B show example of data plots of time-domain signals from the example 3D-IFC system 150. The object, an HEK293T cell stained with CellTrace CFSE with 1 µm fluorescence beads bond to its cell membrane, may be flowing at speed of 0.1 m/s. The data plots show the time-domain data output from the PMT of one channel (e.g., 520/40 nm bandpass) in FIG. 3A, and another channel (e.g., 650 nm longpass) in FIG. 3B. The envelopes detected may be used to reconstructed the 2D image of the cell. The data plots of FIGS. 3A and 3B show time-domain signal crops of a cell as an example taken with the 3D-IFC system 150. In these example implementations, the light sheet was scanning at 200 kHz within a range of 25 µm in z-direction.

Figure 4A:
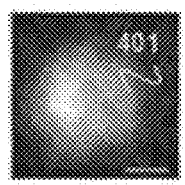
FIGS. 4A-4I shows data plots of 2D and 3D images captured by an example 3D-IFC system, in accordance with some example embodiments.
Figure 4B:
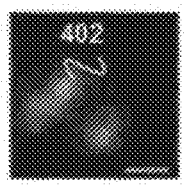
Figure 4C:
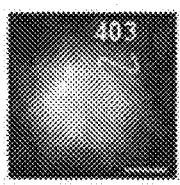
Figure 4D:
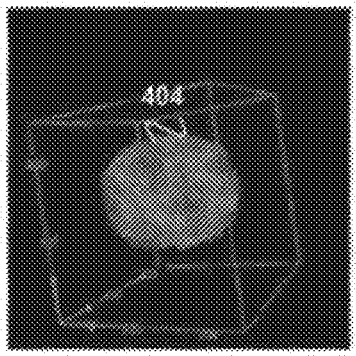
Figure 4E:
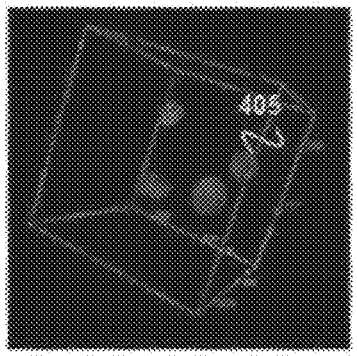
Figure 4F:
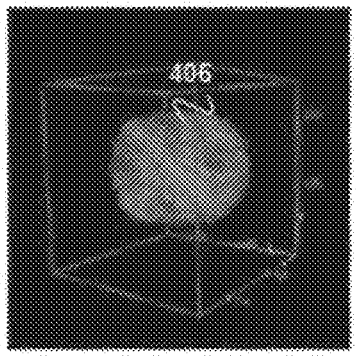
Figure 4G:
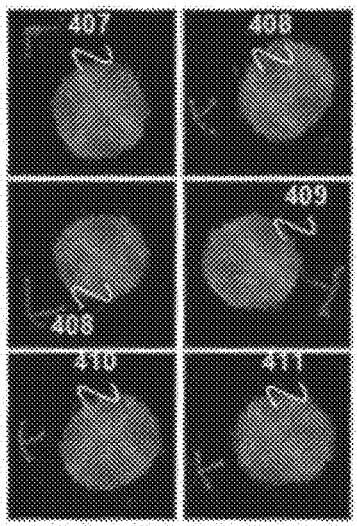
Figure 4H:
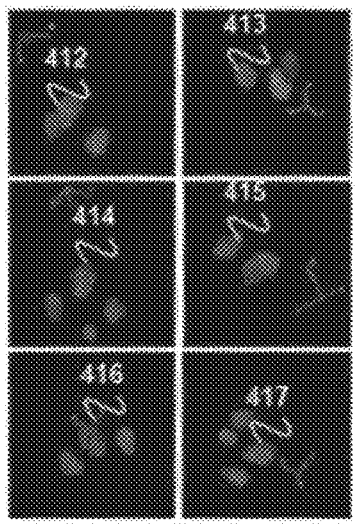
Figure 4I:
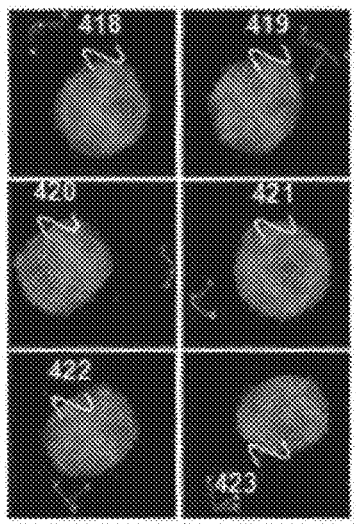

FIGS. 4A-4I show example data plots of 2D images and 3D images captured by the example 3D-IFC system 150 of the HEK293T cell stained with CellTrace CFSE with 1 µm fluorescence beads bond to its cell membrane. In FIGS. 4A-4C, the data plots show 2D images showing green channel (401), red channel (402), and overlay (403) image data, respectively, which were captured and reconstructed by the example 3D-IFC system 150. In these data plots, the scale bars represent 5 µm. In FIGS. 4D-4F, the data plots show 3D reconstructed images showing green channel (404), red channel (405), and merged (406) 3D reconstructed image data produced by the example 3D-IFC system 150. In these data plots, the cube cage represents a 20 μm×20 μm×20 μm space. FIGS. 4G-4I show six different 2D perspectives of the 3D imaged cell in the green channel (perspectives 407-411), the red channel (perspectives 412-417) and the overlay (perspectives 418-423) for 3D images. As shown by the 3D reconstructive images, the 2D perspectives from different viewing angles possess different features.

The 3D images shown in FIGS. 4A-4I demonstrate that there are four fluorescence beads on the cell membrane, but the 2D images contains inexplicit information about the number of beads. In a flow system, one can hardly control the orientation of an object, so capturing 2D images that have only one viewing perspective can generate detection error, especially when relative location is important. As biological specimens are intrinsically three dimensional, capturing 3D images provides complete information about the sample.

Example methods for implementing and/or fabricating the example 3D-IFC system 150 are described. In the example implementations described above, a 100 mW 488 nm laser (iBeam-SMART, Toptica) was used that has an oval beam shape with Gaussian energy distribution, which is collimated, focused, and then expanded to illuminates an area of 1.2 μm (z-direction) by 250 μm (y-direction). An AOD (Isomet) that is driven by a modular, swept-frequency RF power source (Isomet) was used to produce deflected laser beam with different output angles at different time, and therefore scan the laser beam in z-direction. A cylindrical lens and a 10×/0.25 objective lens was used to form light sheet. The fluorescence emission from the sample was collected through a 10×/0.25 objective lens (Mitutoyo) and detected by one PMT (Hamamatsu) at each channel. PMT readouts were recorded by PCIE DAQ card (Advantech).

The fabrication of the spatial filter can include the follow techniques. The design of spatial filter was drawn in Auto-CAD and printed to a transparency mask at 20,000 dots per inch (dpi). A layer of negative photoresist (NR9-1500PY, Futurrex, Inc.) was spun at 3,000 rotations per minute (rpm) on a 6-inch glass wafer. The wafer was heated on a hot plate at 150° C. for 3 minutes then exposed to UV light (EVG620NT, EV Group) through the transparency mask. Post UV exposure, the wafer was baked at 100° C. for another 3 minutes before development in RD6 (Futurrex, Inc.) for 12 seconds. A film of 300 nm thick aluminum was sputtered onto the glass wafer. After metal lift-off, the patterns of the spatial filter were formed and the glass wafer was diced into 12 mm by 12 mm pieces. To help hold the spatial filter in the flow cytometer system, the spatial filter having ten 20 μm by 10 μm slits was mounted to a sample holder fabricated by 3D printing method.

Preparation of cell samples can include the following techniques. The HEK293T human embryonic kidney cell samples were cultured with culture media (DMEM, 10% Fetal Bovine Serum, 1% Penicillin Streptomycin) to 90% confluency in 10 cm petri dish. After 100× dilution of the 1.0 μm fluorescent beads (Ex/Em: 488/645 nm, T8883, Thermo Fisher) from the stock solution, 100 μL of the diluted solution was mixed with 10 mL fresh cell culturing media and added to cell culturing plate. After continuous culturing for 10 hours, the HEK293T cells were harvested, fixed by 4% paraformaldehyde, washed and resuspended in 1× phosphate buffered saline (PBS). After fixation, the cells were stained with CellTrace CFSE cell proliferation kit (Ex/Em: 492/517 nm, Thermo Fisher). Before every imaging experiment, the suspension was diluted in PBS to a concentration of 200 cells/μL.

Example applications of the disclosed 3D-IFC systems and methods can include the following.

DNA Damage: When ionizing radiation or cytotoxic chemical agents cause DNA damage, which forms double stranded breaks (DSBs), the phosphorylated protein gamma-H2AX foci quickly form and represent the DSBs in a 1:1 manner With an antibody raised against gamma-H2AX, the detection and visualization of gamma-H2AX by flow cytometry and immunofluorescence microscopy evaluate DNA damage, related DNA damage proteins and DNA repair. 2D imaging techniques and manual quantification are widely used by many researchers; yet, counting number of foci from a 2D image is not only extremely labor intensive but also unreliable when the number of foci is large and overlapping occurs in one perspective. Obtaining 3D spatial resolution at a high throughput is significantly superior for the analysis of the number, area and density of gamma-H2AX comparing to the 2D techniques. The example embodiments of the 3D-IFC system 150 described herein can provide a high throughput cytometric instrument that is suitable for gamma-H2AZ foci quantification, for example.

FISH: Fluorescent in situ hybridization (FISH) can effectively detect and localize the presence or absence of specific DNA sequences on chromosomes and achieve high accuracy in disease diagnosis and prognosis assessment. FISH signal analysis is typically done on 2D microscopic images. However, detection error may occur when two probed FISH signals are overlapped in the projected image plane where the translocation is in the depth direction. For early or subtle diseases, detecting a small number of abnormal cells can make diagnostic difference, this kind of detection error can be critical. The example embodiments of the 3D-IFC system 150 described herein may be suitable for 3D visualization of FISH signals and may improve the overall accuracy of analysis for some clinical cases.

Internalization/Endocytosis: Many cellular processes such as, e.g., (1) phagocytes recognize, bind, internalize, and eliminate pathogen and cell debris; (2) cellular antibody uptake and presentation; (3) cellular exosome and other nanoparticle uptake; (4) cellular drug uptake and processing, are evaluated by measuring internalization. Either 2D widefield microscopic images or imaging cytometric images only provides incomplete information on the relative location. For example, from a 2D microscopic image, if a particle is observed sitting right in the center of a cell, one can hardly tell if the particle is on the cell membrane (on top of the cell) or the particle is inside the cytoplasm or even in the cell nucleus. Instead, people take images at multiple focal planes to resolve this type of problem. The example embodiments of the 3D-IFC system 150 described herein can perform continuous high-throughput analysis for these internalization studies.

Further embodiments and implementations of the cameraless, high-throughput 3D-IFC systems, methods and devices are described for imaging objects, like cells, based on optical sectioning microscopy captures 3D fluorescence and darkfield images of single cells in flow. The disclosed cameraless, high-throughput 3D-IFC systems and methods provide the capability of co-capturing 3D fluorescence and label-free side-scattering images of single cells in flow with a throughput of approximately 500 cells per second For example, in some example implementations, a high-throughput 3D-IFC system utilizes light-sheet scanning illumination technique and spatial-to-temporal transformation detection technique to enable fluorescent and label-free 3D cell image reconstruction from single-element photodetector readout without a camera. In the example implementations, using the speed and sensitivity benefits of photomultiplier tubes (PMT), the example 3D-IFC system uses multiple scanning techniques to add spatial information in a flow cytometry architecture. 3D imaging may be achieved by laser scanning across the first (z-) axis, the cell translating by flow across the second (y-) axis, and the use of multiple pinholes arranged along the third (x-) axis to produce fluorescent and label-free information from 60,000 voxels per cell. By precisely mapping time to space, a photodetector readout at one timepoint corresponds to one voxel in a 3D space. Example results described below illustrate 3D-IFC of fluorescence and 90-degree label-free side-scattering (SSC) imaging of single cells in flow at a velocity of 0.2 m s−1, corresponding to a throughput of approximately 500 cells per second.

Figure 5A:
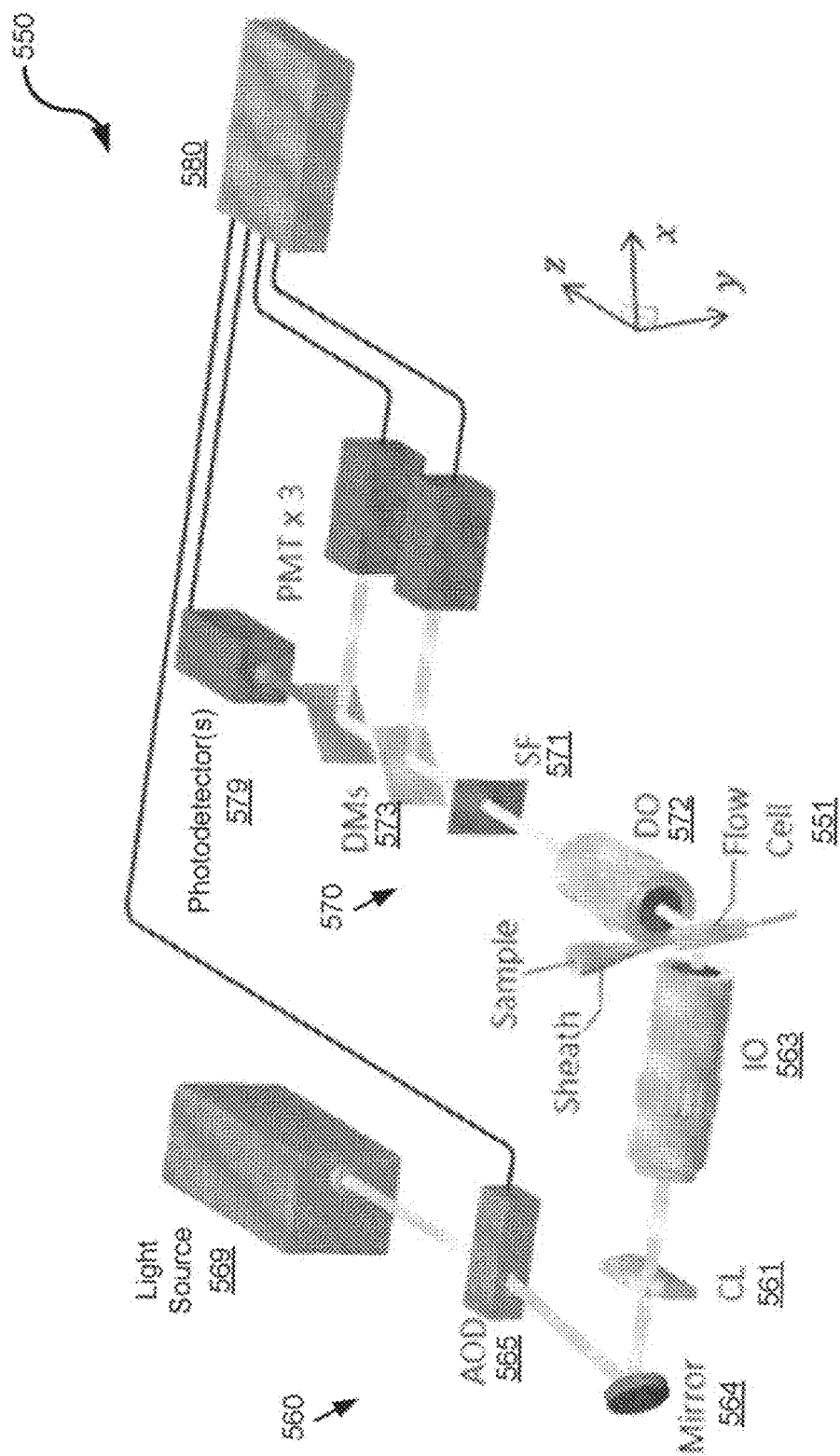
FIG. 5A shows a diagram of an example embodiment of a 3D-IFC system in accordance with the present technology.

FIG. 5A shows another example embodiment of a 3D-IFC system, labeled 550, in accordance with some embodiments of the system 100. As shown in the diagram, the 3D-IFC system 550 includes a flow system 551 that includes a fluidic channel for carrying a fluid sample containing a flow specimen (e.g., particles, living cells, etc.) that is interfaced to a light sheet illumination module 560 and a detector module 570 of the 3D IFC system 550. The light sheet illumination module 560 includes an acousto-optic deflector (AOD) 565 optically coupled to a cylindrical lens (CL) 561 and an illumination objective lens (IO) 563 (e.g., 50×/0.55 illumination objective lens), arranged in an optical illumination path with a light source 569 (e.g., a laser). The cylindrical lens 561 is placed after the AOD 565 to focus the light (e.g., make the laser beam focus) in one direction to form a scanning light sheet. For example, in some embodiments, the light sheet illumination module 560 includes a mirror element 564 between the cylindrical lens 561 and the AOD 565 to allow various positional arrangements of the components of the illumination module 560 while preserving the optical path to deliver light on the flow sample. In some implementations, the AOD 565 produces deflected first-order beam at a different angle for each frequency and therefore generates scanning over time. In some implementations, the fluid sample is 2D hydrodynamically focused by a sheath before entering the square cross section quartz flow cell, discussed further with respect to FIG. 9.

The detector module 570 includes a spatial filter (SP) 571, arranged in an optical detection path between a detector objective lens (DO) 572 (e.g., 10×/0.28 detection objective lens) interfaced with the flow system 551 and an optical photodetector 579 to capture the optical signal data from the flow objects (e.g., cells, particles, etc.). The spatial filter 571 is placed at the image plane of the photodetector 579. For example, the photodetector 579 can be configured to include one or more photodetectors (e.g., such as photomultiplier tubes (PMTs)) such that the detector module 570 detects a particular light spectral range or ranges of the optical signal data. As shown in FIG. 5A, in some embodiments, for example, the detector module 570 includes the spatial filter 571 optically coupled to one or more dichroic mirrors (DM) 573 that is optically coupled to corresponding photodetectors 579 (e.g., PMT) in split optical paths. In some embodiments, the system 550 is configured to the one or more dichroic mirrors (DM) 573 optically coupled to corresponding bandpass filters (BP) 175 in split optical paths with the photodetectors 579. As shown in the diagram of FIG. 5A, for example, the illumination of the flow specimen is configured to be perpendicular to the detection orientation. In some embodiments, the 3D-IFC system 550 includes lenses or light guides to focus and/or direct light at the designated location of another component of the system.

The 3D-IFC system 550 includes an example embodiment of the data processing system 140, which includes a processing unit (e.g., comprising a processor and memory) interfaced with a digitizer (DIG) 580, e.g., 125 MS s−1 digitizer, that digitally processes the output signals of the example PMTs of the detector module 570.

Figure 9:
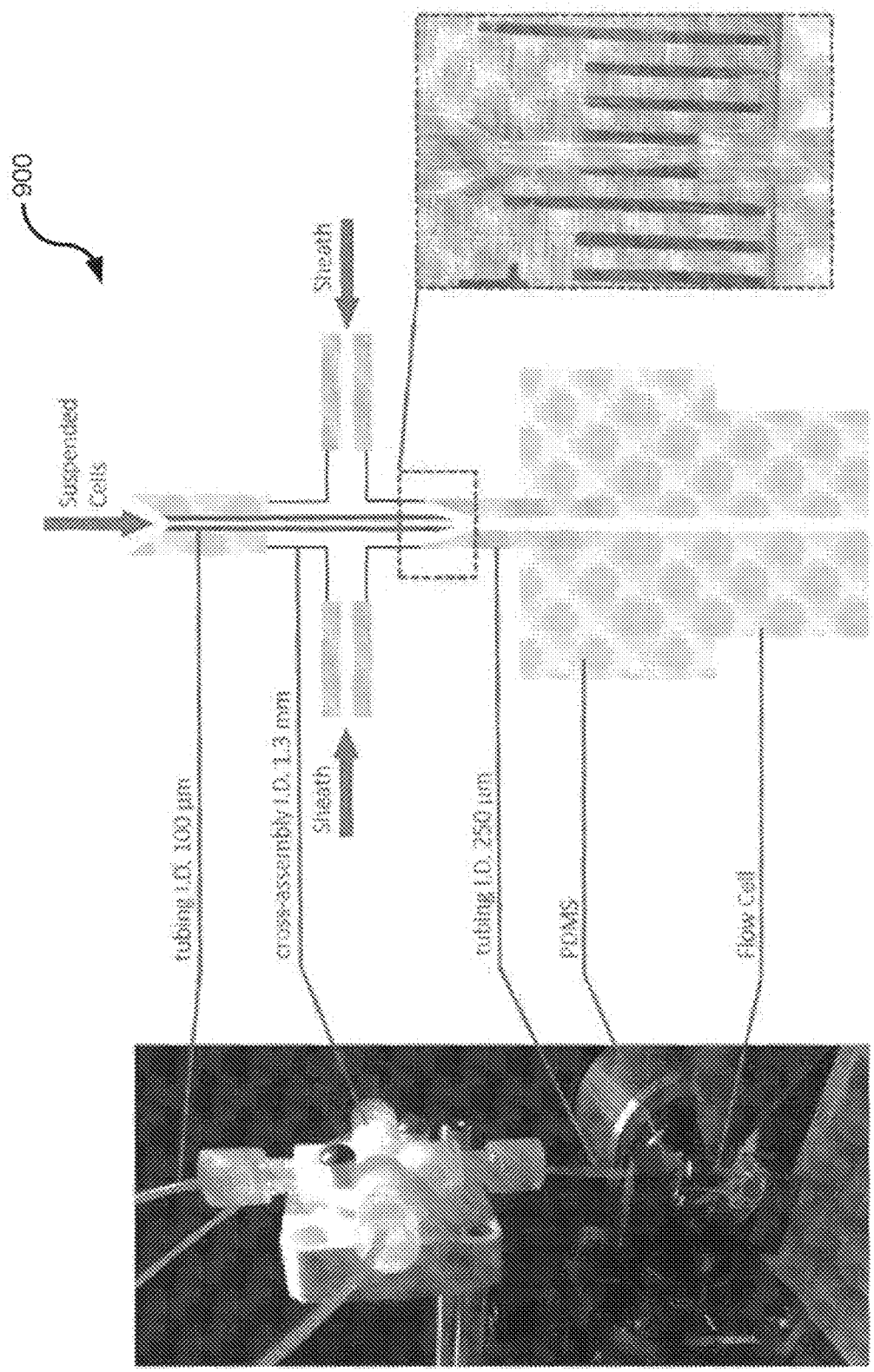
FIG. 9 shows an example of a microfluidic system used in an example 3D-IFC system, in accordance with some example embodiments.

In example implementations of the 3D-IFC system 550, suspended cells may form 2D hydrodynamically focused single file in a quartz flow cell with a square cross section, shown in further detail in FIG. 9. In the example of FIG. 5A, a light-sheet (x-y plane) on the flow cell 551, e.g., with a diffraction limited beam waist and a height of 200 to 400 µm, is formed by laser excitation, scanning in z-direction at a very high rate (e.g., 200 kHz). For example, when a particle or cell flowing through the whole optical interrogation at 0.2 m s−1, a pixelated field of view is represented by a 3D space with X by Y by Z voxels, as shown in FIG. 5C.

Figure 5C:
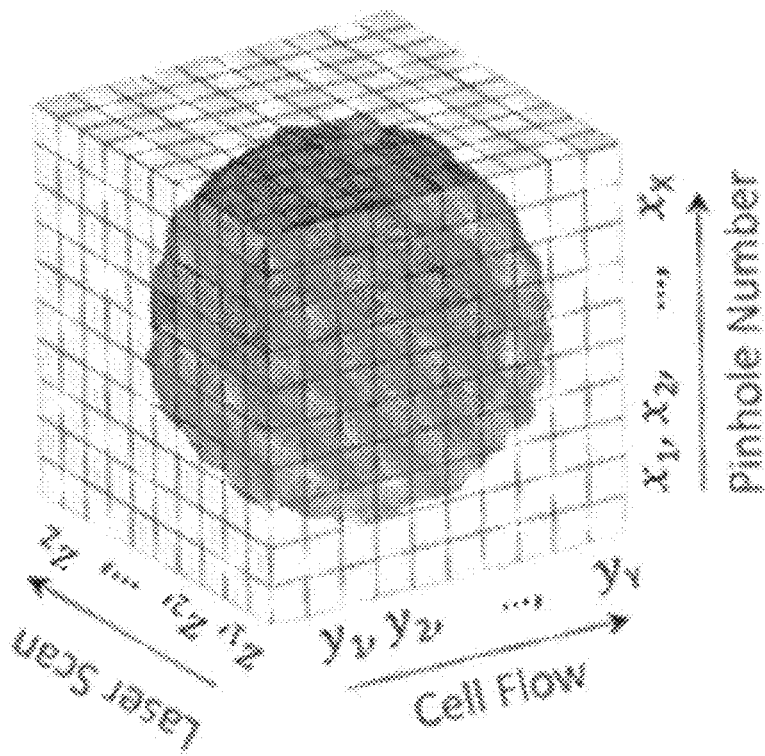
FIG. 5C shows an example of a 3D reconstructed space produced by the data processing system of an example 3D IFC system.
Figure 5B:
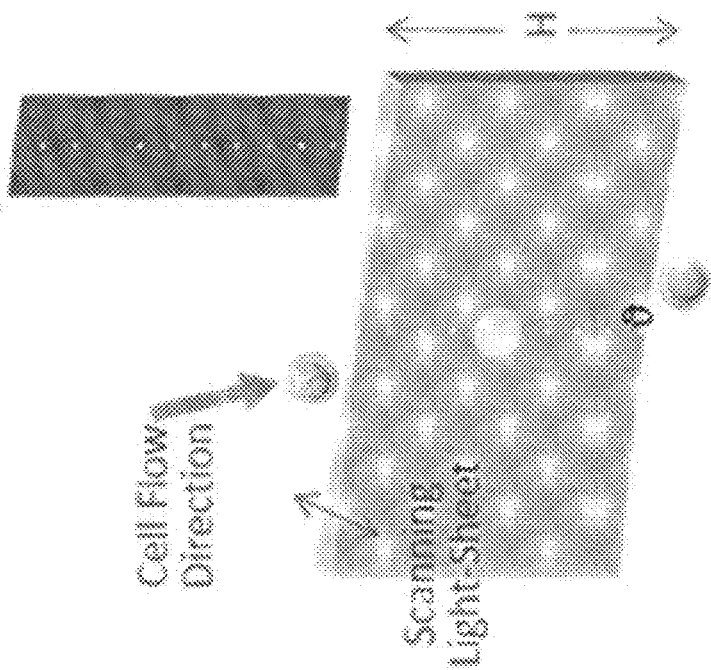
FIG. 5B shows an illustration depicting a cell flowing along the object plane and a spatial filter positioned at image plane from the diagram of FIG. 5A.

FIG. 5B shows an illustration depicting the optical interrogation area of an example flow specimen (e.g., a cell) flowing along the object plane and spatial filter 571 positioned at image plane. The spatial filter 571 includes a surface having a plurality of apertures arranged in a pattern, where each aperture of the pattern is spaced apart along the y-axis (parallel to the flow direction) and varies in its position along the x-axis (perpendicular to the flow direction) with respect to another aperture of the pattern. As shown in the diagram of FIG. 5B, H represents the height of the light-sheet; ϑ represents the tilt angle between flow (y-axis) and vertical line. Illumination light-sheet propagates horizontally and scans in z-axis, sample flows in y-axis, x is the orthogonal axis.

The spatial filter at the image plane uses pinholes to produce line scans across the x-axis. For example, a pinhole array on the spatial filter is aligned at a tilting angle, ϑ, to the flow stream, so the pinhole array also steps along x-direction. In this manner, each pinhole allows light from voxels with a distinct x-index to pass to PMT detector (e.g., details of this example mask are discussed later in this disclosure). The imaging process begins when a flowing cell appears at the first pinhole of the spatial filter. During the first light-sheet scanning period (e.g., 5 µs), light intensity of voxels $z_{1-Z}$ with $x_1 y_1$ index is collected. As the cell flows downstream in y to the next position, $x_1 y_2$, the corresponding $z_1$ voxels are produced. This is repeated until the cell completely passes pinhole 1 when the whole 2D yz-slice at $x_1$ is imaged. As the cell travels farther downstream in the y direction (e.g., flow direction), it reaches the following pinholes and yz-slices of at $x_2$ to $x_x$ are recorded. See FIG. 5C, for example.

FIG. 5C shows an example of a 3D reconstructed space produced by the data processing system of the 3D IFC system 550. From the processing, for example, the resolution on the X-axis is determined by the number of pinholes (e.g., pixelated field of view in x-direction); the resolution of Y-axis is determined by the distance between two slits (e.g., pixelated field of view in y-direction); and the resolution of Z-axis is determined by the light-sheet scanning range (e.g., pixelated field of view in z-direction).

Figure 5D:
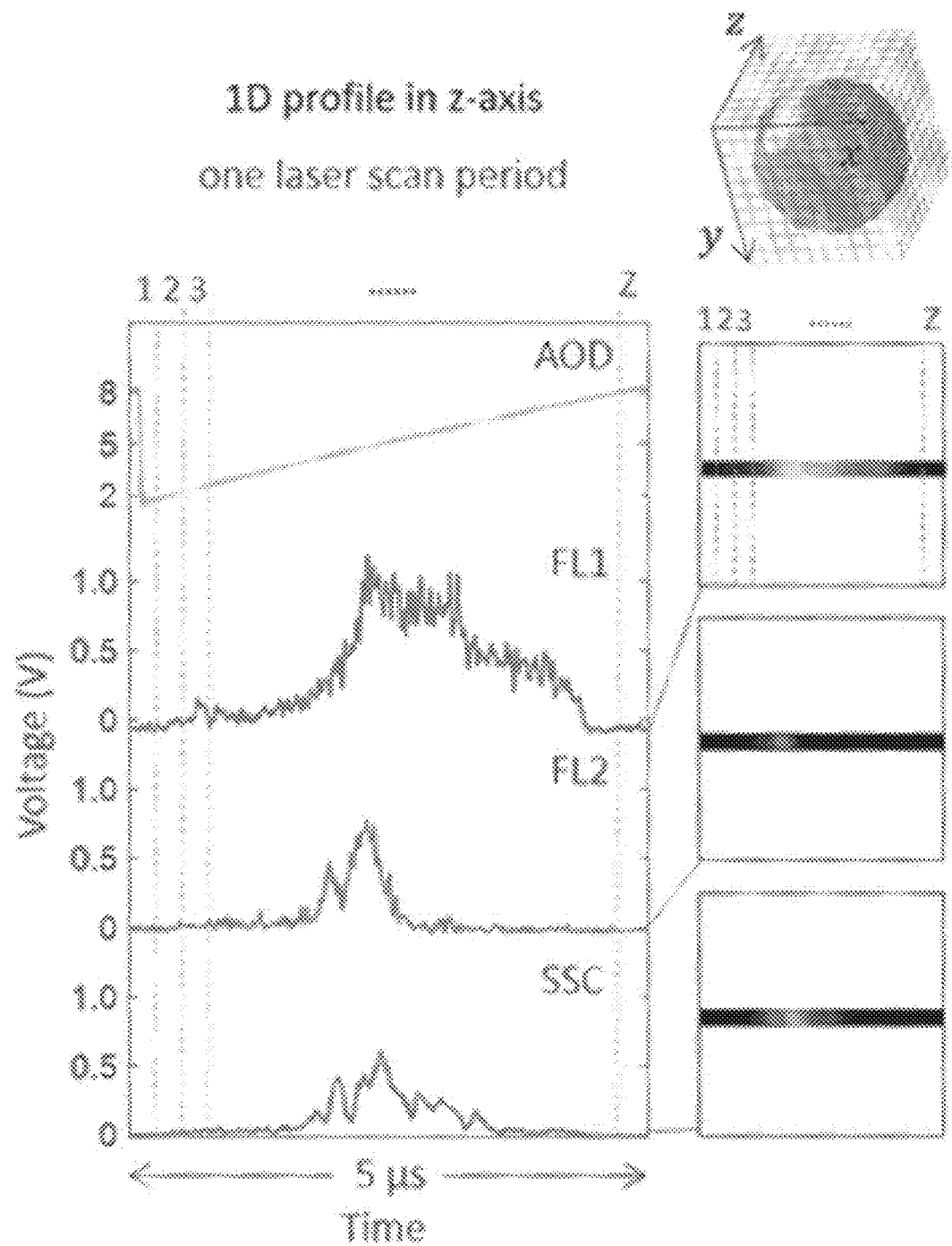
FIGS. 5D-5F show an example output of an example 3D-IFC system demonstrating time to 3D-space mapping, in accordance with some example embodiments.
Figure 5E:
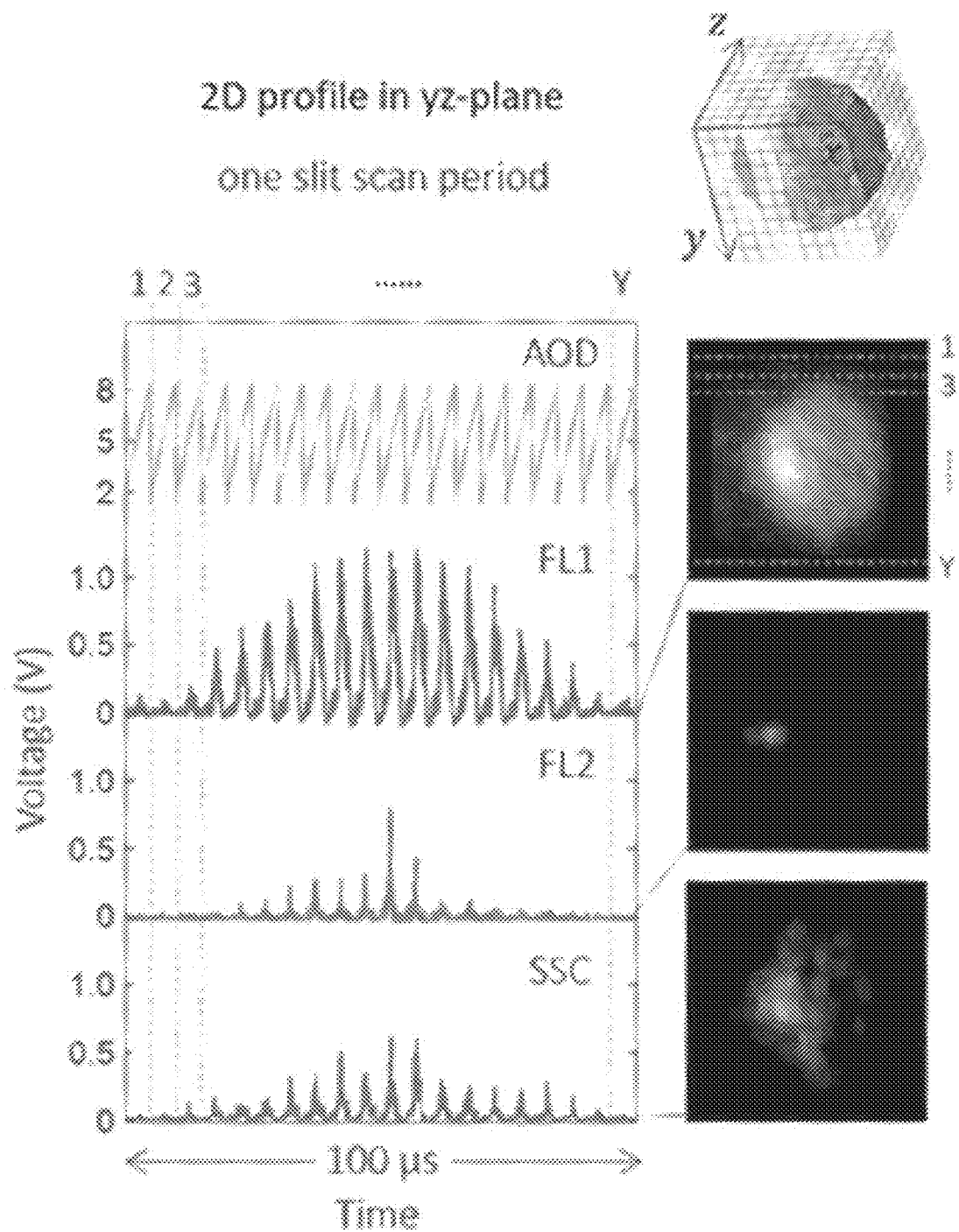
Figure 5F:
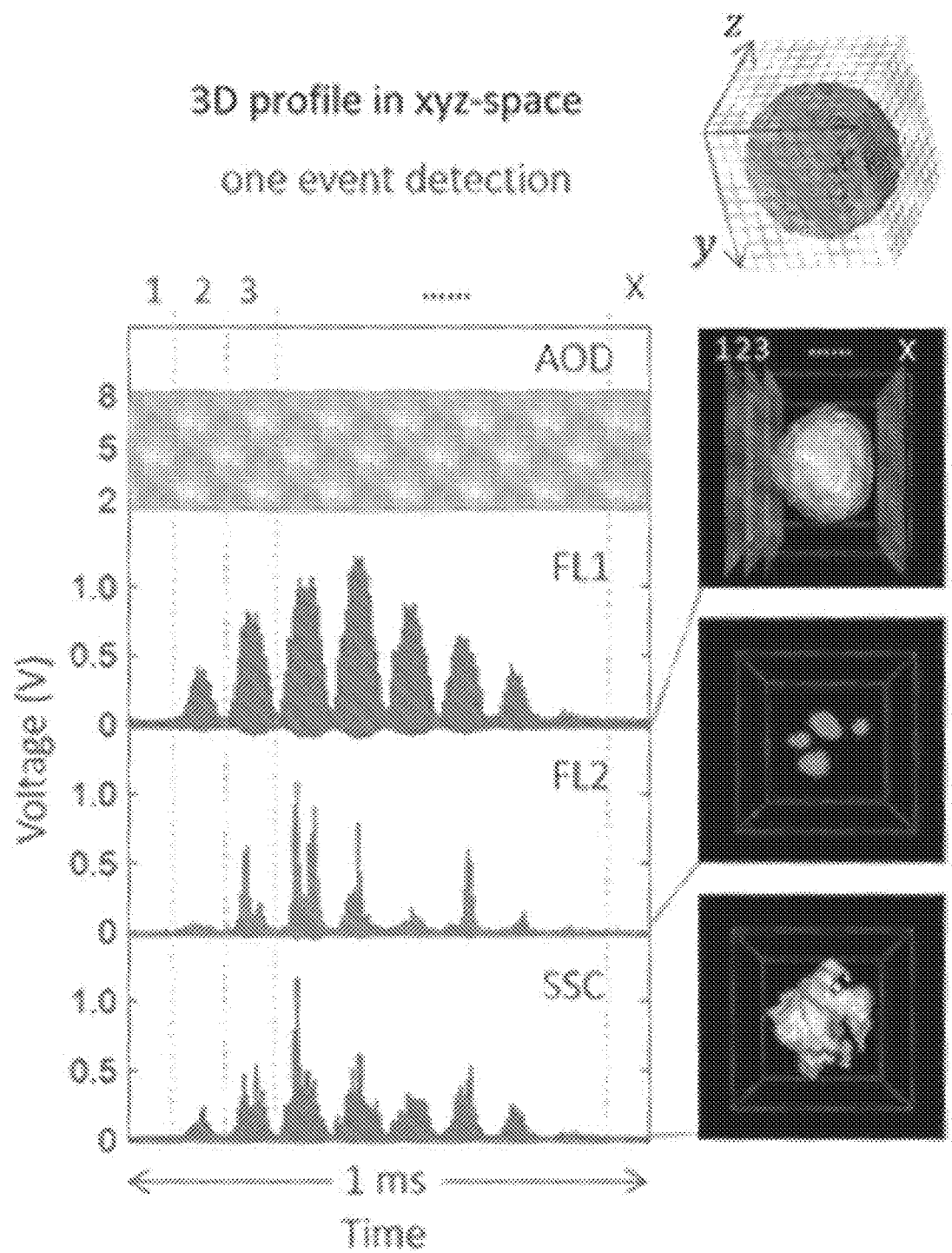

FIGS. 5D-5F show an example output of the 3D-IFC system 550. In the example implementations of the system 550, the detected time-domain multi-parametric signals (e.g., multi-color fluorescence, FL1 and FL2, and side-scattering, SSC, light intensities) were synchronized with the reference output of the tuning voltage of the AOD driver, which denotes the z-position of the detected voxel. For example, at a 200 kHz scanning rate, a one-dimensional (1D) intensity profile in z-axis is recovered from the time-domain signal within a time period of 5 µs (e.g., see FIG. 5D). During the ~100 µs of cell travel between pinholes, ~20 periods of laser scanning are performed, and an yz-plane 2D image array is recovered from the PMT readout (e.g., see FIG. 5E). As the cell travels through the entire interrogation area, a stack of 2D yz-plane images are recovered, and the final 3D image is reconstructed, with the ordinal pinhole number indicating the voxel's x-position. In the example shown in FIG. 5F, a 10-pinhole spatial filter produces ten 2D yz-plane images and a signal length of 1 ms, corresponding to a throughput of 500 cells per second. The bandwidth of the PMT and the digitizer used in the example system 550, e.g., 150 MHz and 125 MHz, respectively, in this implementation, supports the throughput at 60,000 voxels per 3D cell image. Each 3D cell image in a 3D space of 20 µm by 20 µm by 20 µm, is resized to 100 by 100 by 100 pixels for 3D image analysis and quantitative measurements.

Figure 10:
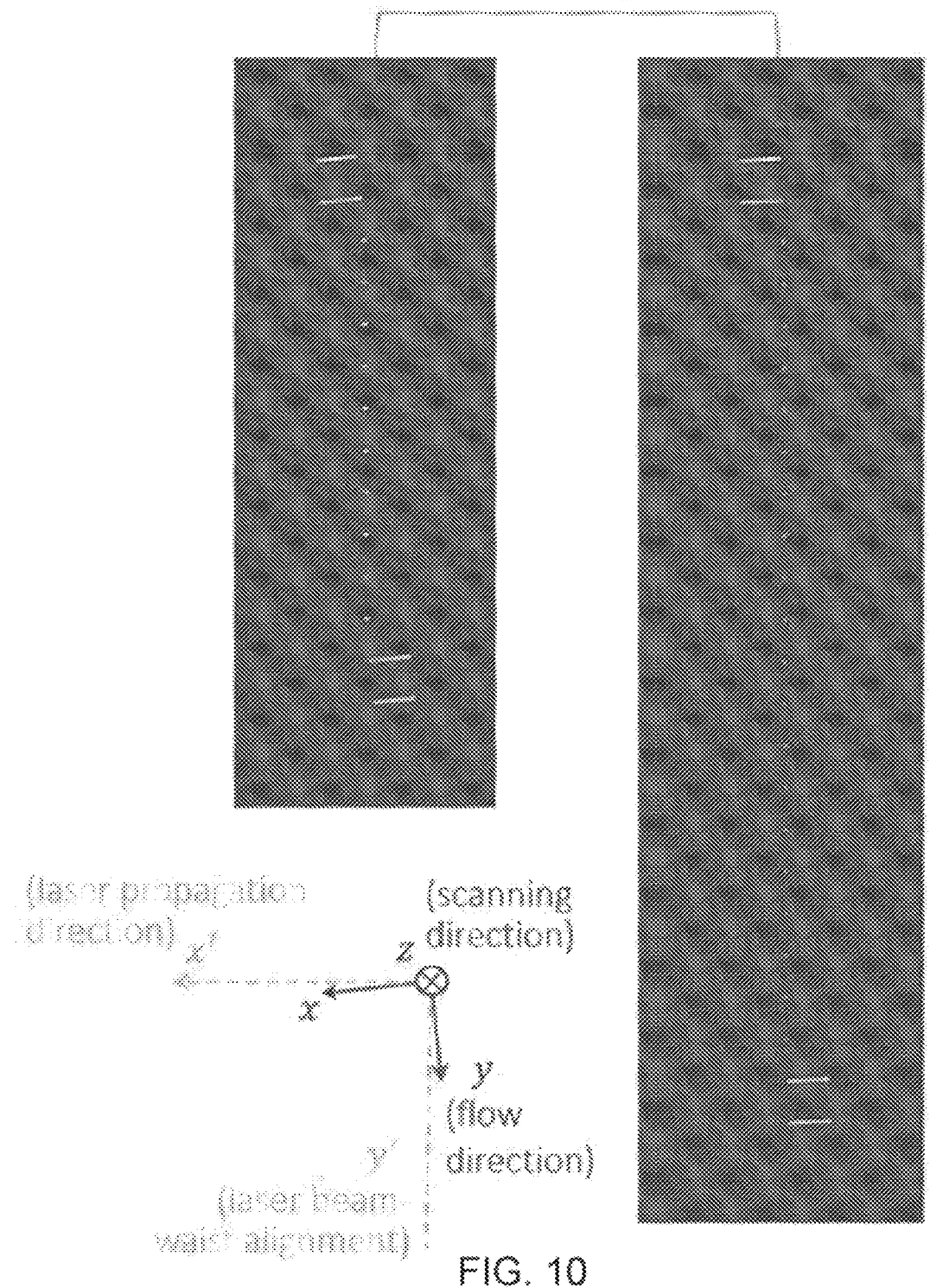
FIG. 10 shows diagrams of examples for a spatial filter design, in accordance with some example embodiments.

To measure the speed of each cell for image reconstruction by the spatial-to-temporal transformation, pairs of slits upstream and downstream of the pinholes are added to the optical spatial filter (see, FIG. 10). The measured rate of the cell moving through the detection zone, and the known frequency of the light-sheet scanning rate ensures each voxel in a 3D-IFC image has a distinct time-domain value, and all voxels can be discreetly captured in time from single-element PMT. 3D cell images are then reconstructed from the time-domain signal.

FIG. 5D depicts a one light-sheet scan period that produces 1D light intensity profile in z-axis. The PMT voltage readout of one timepoint corresponds to the light intensity of one voxel in z-axis.

FIG. 5E depicts that while an object travels along y-axis, multiple scans produce a 2D profile in yz-plane within one pinhole scan period. Each section—separated by dotted lines—corresponds to the light intensity of one row in the 2D image stack.

FIG. 5F depicts when an object completely passes through the spatial filter covering area, the time-domain signal contains the complete information of the 3D profile in xyz-space. Each section corresponds to one 2D image slice. In the diagram of FIG. 5F, AOD refers to the tuning voltage of the AOD driver; FL1 refers to the PMT readout of fluorescence detection channel 1; FL2 refers to the PMT readout of fluorescence detection channel 2; SSC refers to the PMT readout of side-scattering light detection channel.

To demonstrate the cellular imaging capability of 3D-IFC system 550, for example, suspended single cells were imaged at a flow speed of 0.2 m s$^{-1}$. The example implementation of the system 550 produced example image data of mammalian cells, including two-color fluorescence and unlabeled dark-field (side-scattering) 3D images. For the example implementations, HEK293 cells were stained with an intracellular carboxyfluorescein dye (CFSE) and bound with a random number of 1 µm fluorescent carboxylate-modified polystyrene beads.

Figure 6A:
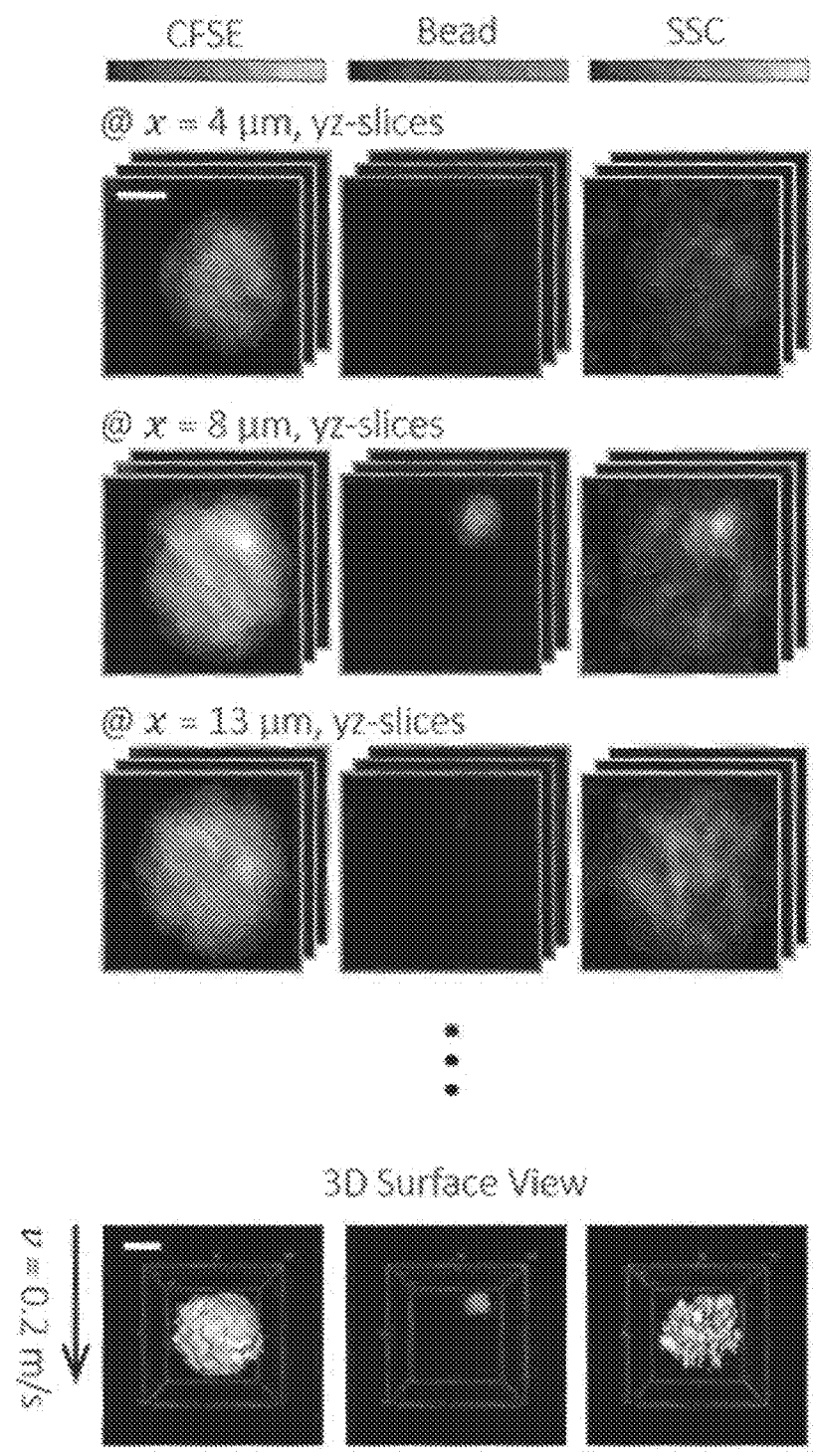
FIG. 6A-6C show images and data plots from an example 3D-IFC system using CFSE-stained HEK-293 cells bound with 1 μm fluorescent beads, in accordance with some example embodiments.
Figure 6B:
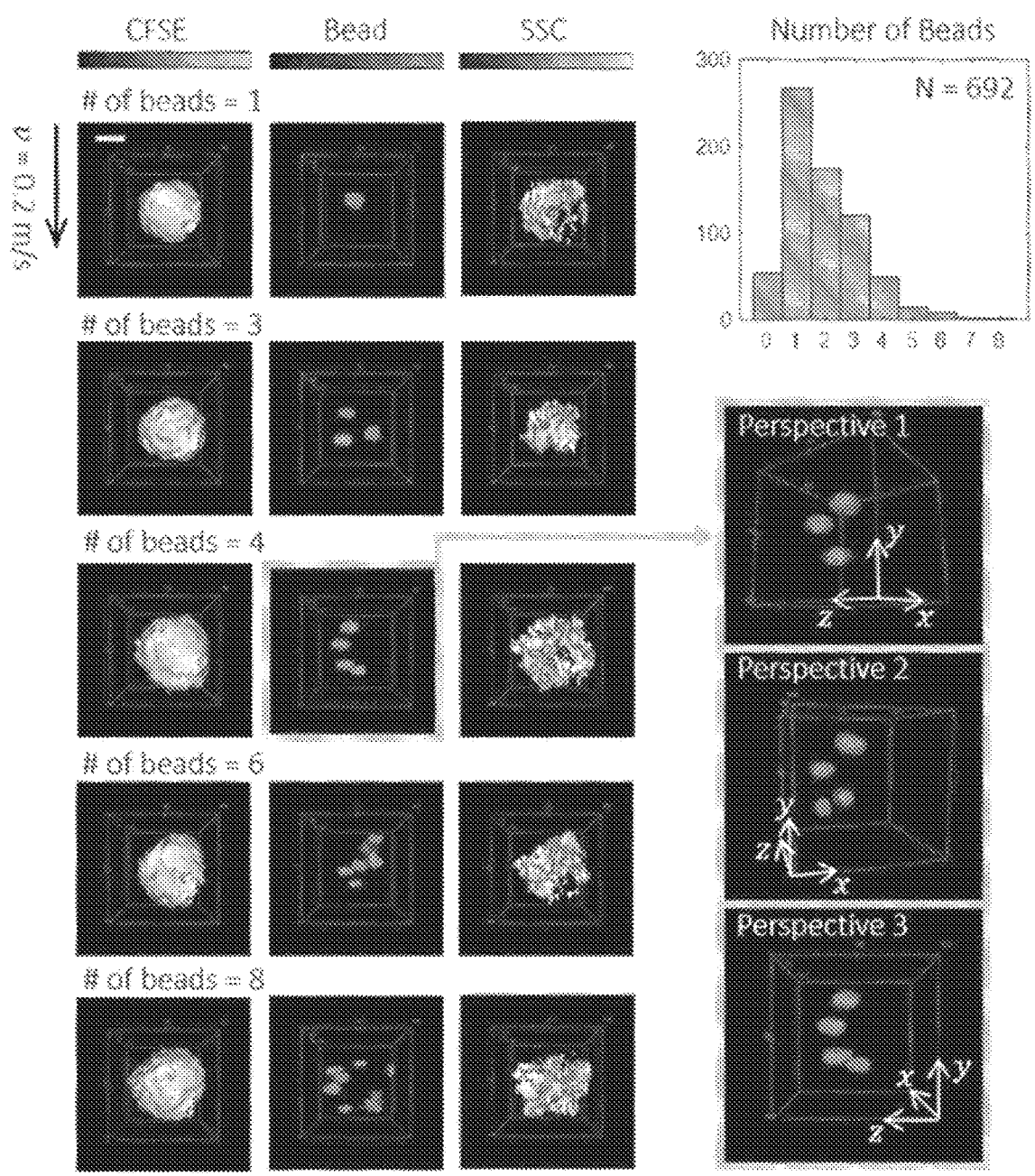
Figure 6C:
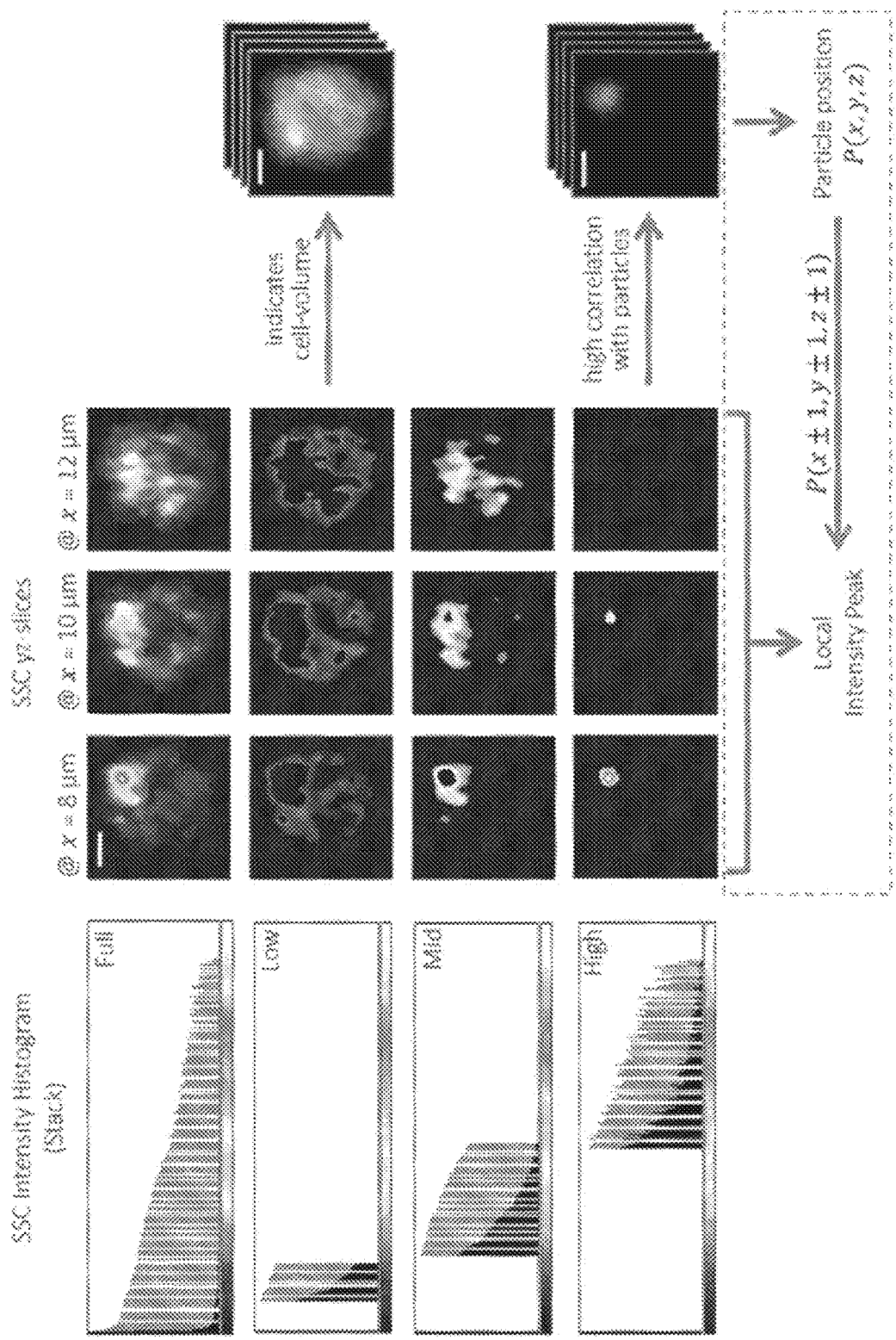

FIG. 6A-6C show images and data plots from an example implementation of the 3D-IFC system 550 using CFSE-stained HEK-293 cells bound with 1 µm fluorescent beads. FIG. 6A depicts an example of recovered 2D yz-plane images and the assembled 3D surface-rendered view of CFSE fluorescence, bead, and SSC (bottom row). FIG. 6B depicts examples of 3D images of cells bound with beads and histogram detection events. The relative position relationship in 3D space indicates that the particle counting in the 3D-IFC is independent of cell orientation. In the example of cell bound with four beads, occlusion in specific perspective is a likely source of error for particle counting with 2D images. FIG. 6C depicts an example of intensity-based processing of 3D SSC images. The left column of FIG. 6C shows intensity histograms of 3D SSC image of the cell shown in FIG. 7A. P(x, y, z) is the position of 1 µm size bead determined using 3D fluorescent image; within each bead position's ±1 µm area, the local intensity peak in 3D SSC image can be found. In FIG. 6C, the scale bars represent 5 µm. In the example implementations, the flow speed was 0.2 m/s. The CFSE was intracellular carboxyfluorescein dye, with Ex/Em: 488/517; the bead was carboxylate-modified fluorescent microspheres, with Ex/Em: 488/645; and the SSC, 90-degree side-scattering.

Referring to FIG. 6B, it is noted that while 2D bead images overlapped, the 3D-IFC resolved the exact number of particles from the reconstructed 3D images, which is important for some localizing and co-localizing features. In a flow system, cells and their internal structures are orientated at random, and as a result, 2D images may be from an unfavorable viewing perspective. Yet, using the disclosed 3D-IFC systems, multiple perspectives can be achieved via 3D-IFC cell tomography, which can provide improved relative position relationships and spot counting results, which favors both machine vision and human visualization. Using the side-scatter dark-field imaging mode, for example, the 3D-IFC system 550 generated a 3D spatial distribution of scattered light. Refractive index variations will scatter light when the object is illuminated by visible light, and the size and refractive index distributions of the scattering regions determine the distributions of the scattered light. The 3D SSC images represent the spatial distribution of those refractive index (n) variations among the fluid (PBS, n~1.335), the cells (n~1.3-1.6) and the polystyrene beads (n~1.6). As shown in FIG. 6C, intensity-based low-pass filtered SSC image indicates cell volume, and high-pass filtered SSC image correlates with the fluorescent image of beads.

Figure 7A:
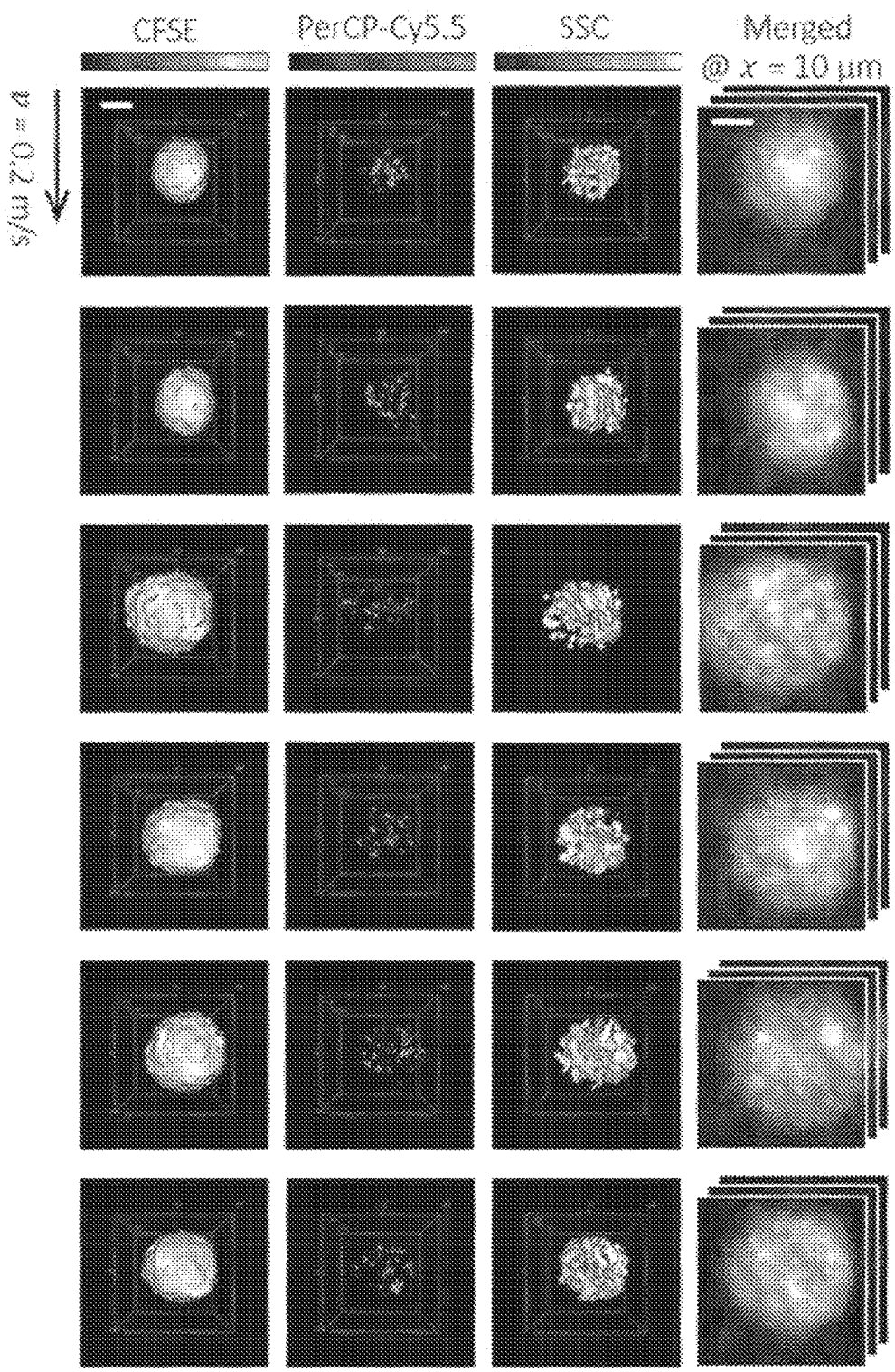
FIGS. 7A and 7B show images and data plots of fluorescent γH2AX foci imaged by an example 3D-IFC system, in accordance with some example embodiments.
Figure 7B:
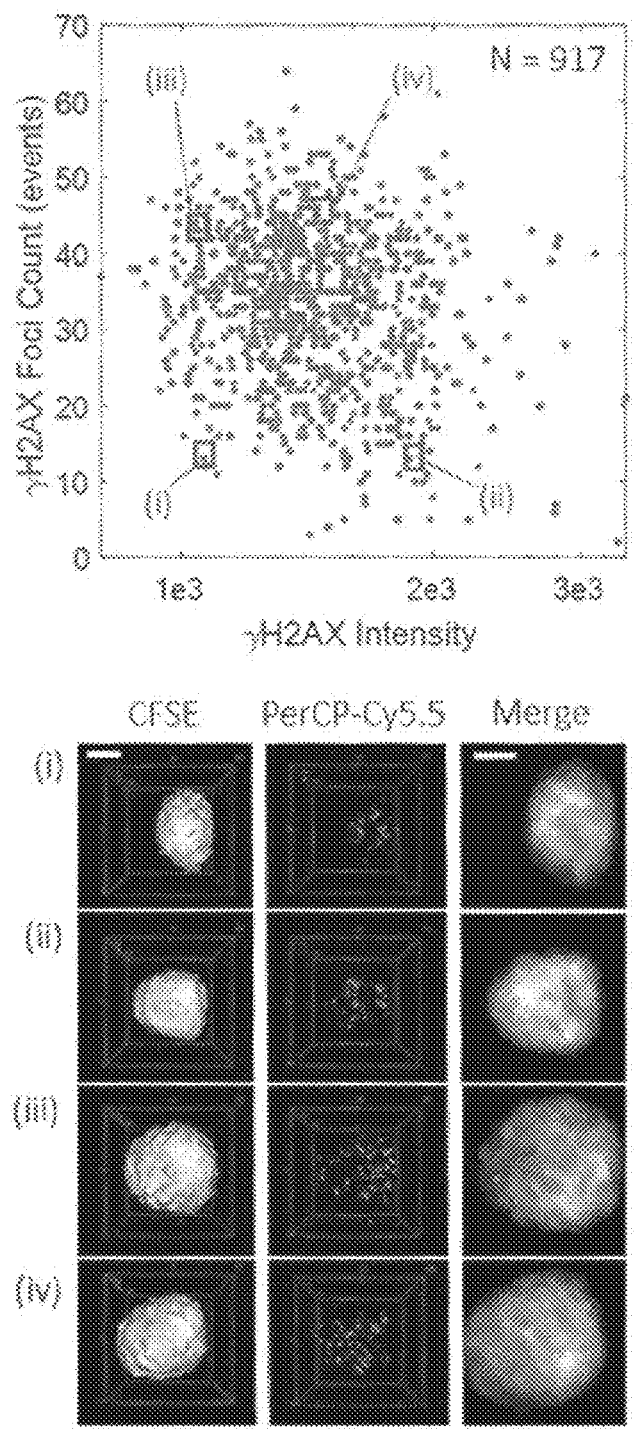

The disclosed 3D-IFC systems are capable of obtaining information practically unobtainable by conventional imaging flow systems. Take for example the following. When ionizing radiation or cytotoxic chemical agents cause DNA damage in the form of double stranded breaks (DSBs), the phosphorylated protein gamma-H2AX (γH2AX) forms foci at DSBs in a 1:1 manner With anti-γH2AX immunolabeling, foci reflect DNA damage and ability for DNA repair. 2D imaging techniques and manual quantification are used today, but counting foci from 2D images is labor intensive and unreliable due to perspective dependence. To evaluate foci counting of the 3D-IFC system, immunolabeled γH2AX foci in CMK3 cells may be imaged (e.g., a glioblastoma multiforme cell line) after 6 Gy of gamma-irradiation. Representative cell images are shown in FIGS. 7A and 7B. This example data show that the number of γH2AX foci is unrelated to the fluorescence intensity, thus intensity-based measurements with conventional flow cytometry metrics poorly reflects DNA damage. In contrast, the 3D-IFC system 550 was able to produce an accurate and rapid analysis of the number of γH2AX-positive foci.

FIGS. 7A and 7B show images and a data plot depicting example results of fluorescent γH2AX foci imaged by the 3D-IFC system 550. FIG. 7A shows representative 3D images of irradiation damaged glioblastoma CMK3 cells stained with CFSE and γH2AX antibody conjugated PerCP/Cy5.5; and their two-color fluorescence 2D yz-plane merged image slices at x=10 µm. The high quality of the 3D images shows that the 3D-IFC is suitable for DNA-damage foci related study. FIG. 7B shows an example of a scatterplot of 917 detection events in the γH2AX intensity and foci count together with images of the cells within the marked regions (i)-(iv) in the scatterplot. The data show that foci count is unrelated to the fluorescence intensity from labelled γH2AX, thus intensity-based measurements with conventional flow cytometry metrics are unable to evaluate the extent of DNA damage. In the images, the scale bars represent 5 μm. The flow speed during the example implementations was 0.2 m/s. For the CFSE, intracellular carboxyfluorescein dye, the Ex/Em was: 488/517; for the PerCP-Cy5.5: DNA-damage antibody conjugated dye, the Ex/Em was: 490/677.

Peripheral blood leukocyte morphology is important clinical diagnostic and prognostic measure for acute and longitudinal evaluations. Example implementations of the 3D-IFC system 550 were conducted to demonstrate such peripheral blood leukocyte morphology.

Figure 8A:
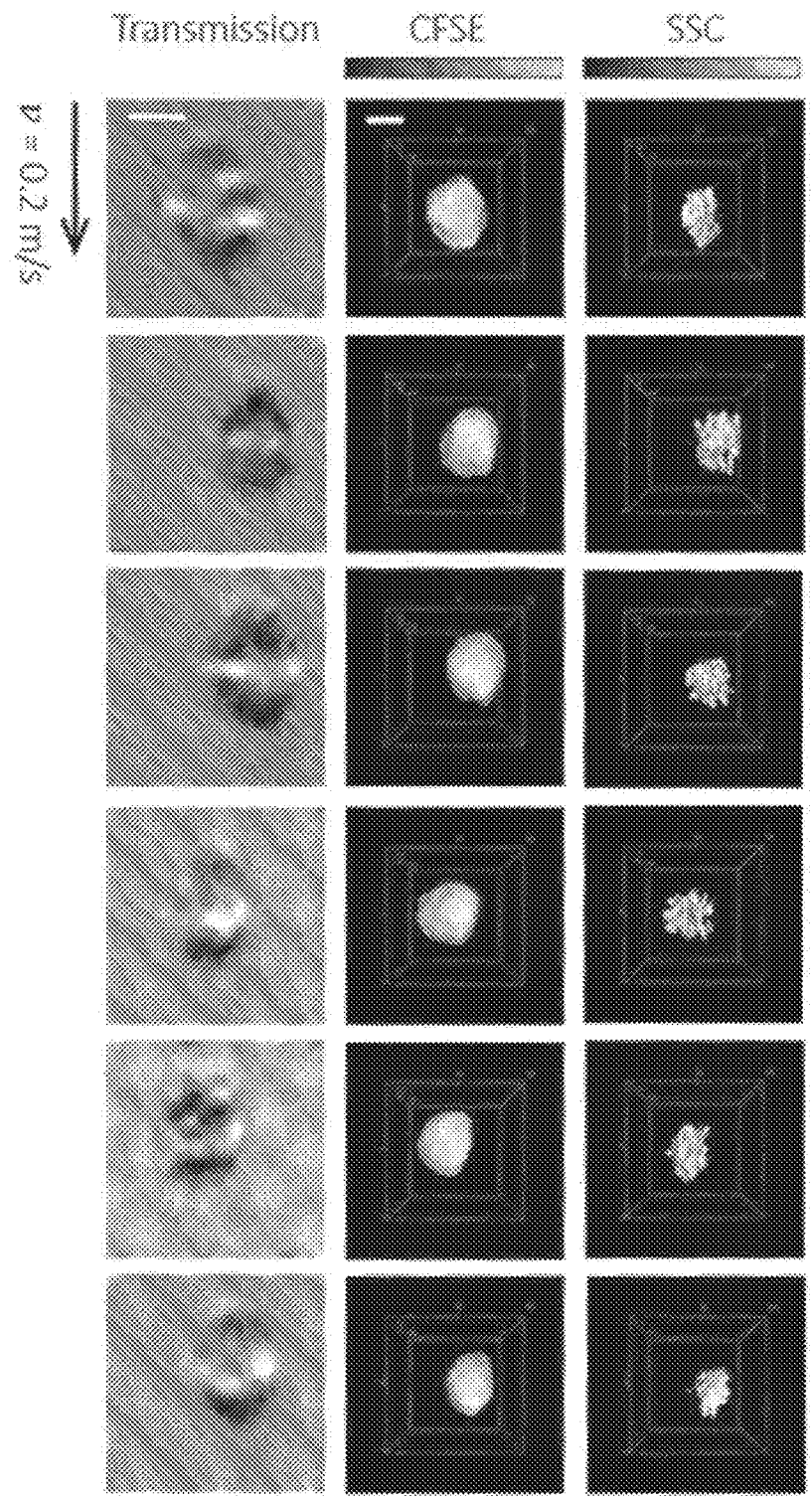
FIGS. 8A-8D show images and data plots depicting leukocyte cell morphology determined by an example 3D-IFC system, in accordance with some example embodiments.
Figure 8B:
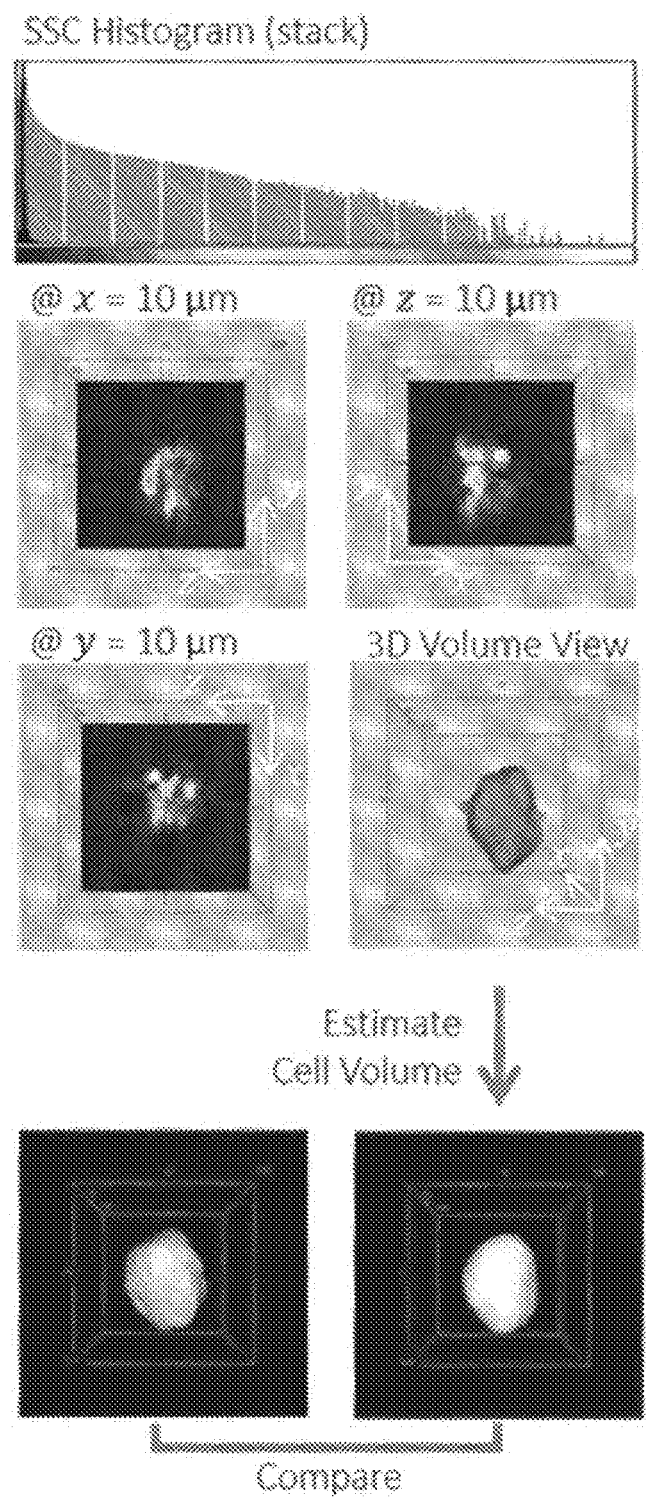
Figure 8C:
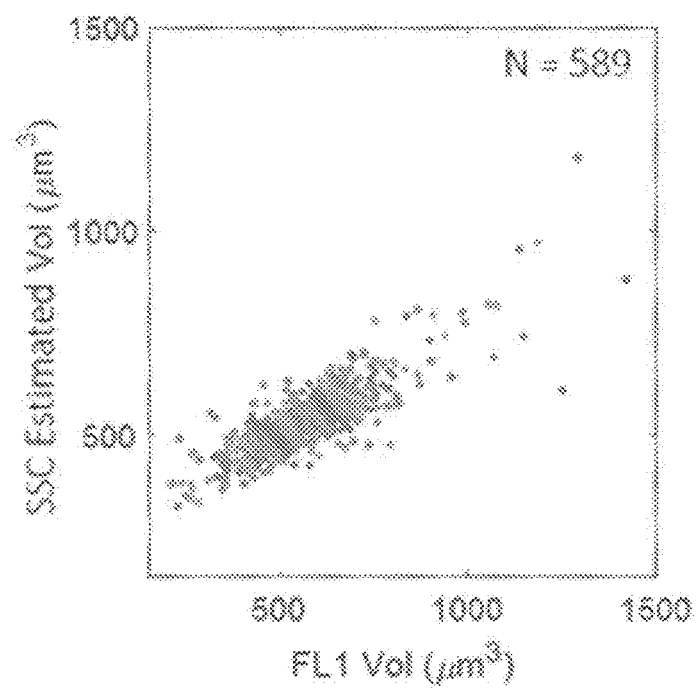
Figure 8D:
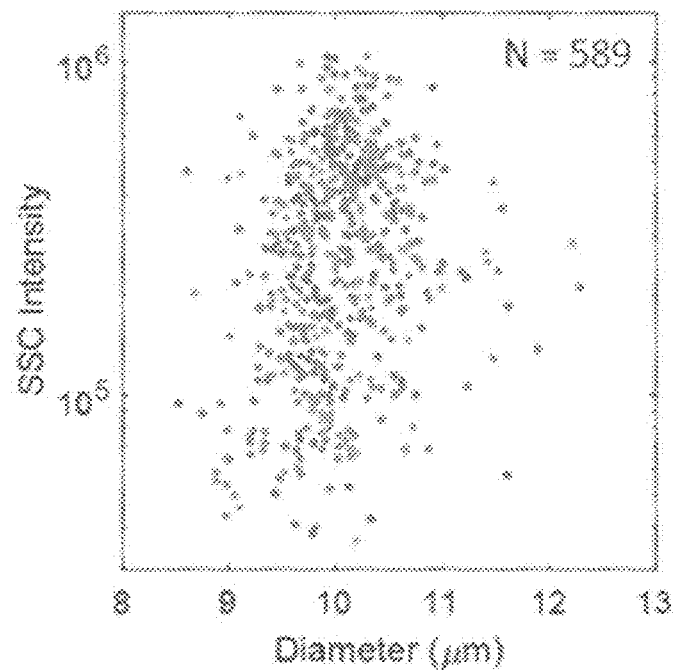

FIGS. 8A-8D show images and data plots depicting leukocyte cell morphology determined by the 3D-IFC system 550. FIG. 8A shows representative 2D transmission images (left column) and 3D images of leukocytes. FIG. 8B shows an example of an intensity histogram of SSC signal of the first cell shown in FIG. 8A and its 3D profile in Orthoslice view and Volume view. Cell volume estimation based on 3D SSC image matches the fluorescence volume. FIG. 8C shows a scatterplot of 589 detection events in the CFSE (FL1) volume and SSC-based estimated cell volume. FIG. 8D shows a scatterplot in the cell diameter calculated from SSC-based estimated cell volume and SSC intensity. In these figures, the scale bars represent 5 μm. The flow speed was 0.2 m/s for the example implementation.

FIG. 8A shows representative 3D-IFC imaging of leukocytes in three imaging modes: 2D transmission image (e.g., a 3D-IFC parameter) and 3D fluorescence and side-scattering images. The leukocyte SSC signal not only indicates nuclear granularity but also provides cell volumetry obtained from low intensity (low refractive index) SSC imaging. Here two or more intensity bands of 3D SSC signal can be used to generate two or more images that reflect their corresponding refractive indices, such as the cytosol and nucleus; whereas conventional flow SSC intensity signal is dominated by contributions of the nucleus. As shown in FIGS. 8B and 8C, a 3D SSC image can be used to produce cell volume that matches the transmission and fluorescence results.

Further information about the materials and methods used in the example implementations of the 3D-IFC system 550 to obtain and produce the results is described below.

In some embodiments, the particle motion system 110 (e.g., a particle flow cell embodiments) can include a microfluidic system like that shown in FIG. 9, which can continuously introduce suspended cells to the optical interrogation area. Since the position of the cells in the cross-section of the microchannel is aligned with the optical field of view in all the x-, y- and z-directions, a reproducible and stable flow speed for cells is obtained by tightly focusing the cells at the center of the square cross-section. Suspended cells in a sample injected by a syringe pump are hydrodynamically focused into a single stream. A sheath flow is used to confine flowing cells in both x- and z-direction. An air pressure pump together with a liquid flow meter are used to provide stable sheath flow. At the junction of sheath flow and sample flow, tubing ends are specially tapered to keep symmetric flow. The flow rate ratio between the sample and sheath is precisely controlled to be 100:1 to ensure particles flowing at a high speed and within the optical field of view.

FIG. 9 shows an example of a microfluidic system 900 used for the example particle flow cell 551 of the example 3D-IFC system 550. FIG. 9 includes diagram and photograph of the example microfluidic system 900 interfaced with tapered tubing. As shown in the diagram, suspended particles or cells in the fluid can flow through the channel to an example quartz flow cell, which in this example has a cross-section dimension of 250 μm by 250 μm and a length of 20 mm.

In some example embodiments of the system 100, the optical system is arranged in a light sheet fluorescence microscopy configuration (like that shown in FIG. 1C or FIG. 5A), which illuminates a specimen in a single plane at a time whilst the signal is detected in a perpendicular (z-) direction. In example implementations of the 3D-IFC system 550, a 1000 mW 488 nm laser (Coherent) that has a circular beam shape with Gaussian energy distribution was used, which is collimated, expanded, and then focused to illuminates an area of 0.6 μm (z-direction) by 250 μm (y-direction). A cylindrical lens and a 50×/0.55 objective lens (Mitutoyo) was used to form light sheet. An acousto-optic deflector (AOD) is configured in the optical system to produce high-speed scanning in z-direction (e.g., 200 kHz in this implementation).

A single-pixel photodetector can detect fluorescence or scattering light passed the spatial filter in each channel, and an image is reconstructed from the time-domain output. For example, for the spatial filter 579, the pinholes were arranged vertically. As shown in FIG. 5B, the flow (y-) direction was tilted to create an angle ϑ, which is determined by the field of view in x-direction $D_x$ the field of view in y-direction $D_y$, and number of pinholes X, $\vartheta = \tan^{-1}(D_x/X \cdot D_y)$). Also, because the z-direction illumination light-sheet scans over a range that is larger than the cell size, and at a speed that is much higher, typically more than 20 times higher than the cell travelling speed in y-direction, when cell passing one pinhole, the light intensity of one yz-plane image slice is recorded; when cell passing the next pinhole, another yz-plane image stack is acquired. For example, combining the scanning light-sheet, the cell's flow motion, and the spatial filter, the detector only detects the fluorescence of an individual voxel in the cell at a time, which allows one-to-one time to space mapping. The concept can be mathematically modeled by the following equations. The measured PMT signal S(t) can be expressed as:

$$S(t) = \iiint \left\{ \iiint C(x', y' - v_C t, z) I(z, t) psf(x - x', y - y') dx' dy' \right\} \cdot F(Mx, My) dx dy dz = \iiint \{ C(x, y - v_C t, z) I(z, t) \} \cdot F(Mx, My) dx dy dz \qquad (6)$$

where C(x, y, z) is the 3D cell fluorescence or scattering light intensity profile, I(z,t) is the light-sheet illumination, F(x, y) is the characteristic function of the spatial filter, $v_C$ is the cell flowing speed, M is the magnification factor of the detection system.

The acoustic frequency sent to the acoustic transducer in the AOD may be varied to deflect the beam to create illumination at different z-position. The tuning voltage that produce continuous change of acoustic frequency can be generated by various types of waveforms, such as sinusoidal, triangle, etc. For the most laser power efficient, the tuning voltage is set to be changing in a sawtooth manner, so the position of the light sheet in z-direction $z_0(t)$ can be described as:

$$z_0(t \in (nT, (n+1)T)) = v_i(t - nT)$$
$$n = 0, 1, 2, \ldots \qquad (7)$$

where T is the light-sheet illumination scanning period, $v_i$ is the scanning speed in z-direction.

By using the cylindrical lens, the laser is diverged to form a light-sheet with a height in y-direction of 200-400 μm. The scanning light-sheet illumination I(z,t) can be described as Gaussian beam:

$$I(z, t) = k \cdot e^{-\frac{(z - z_0(t))^2}{\sigma^2}} \qquad (8)$$

With oversampling PMT signal readouts, the spatial resolution in z-direction is diffraction limited. The Gaussian beam waist was measured 0.73 μm and was approximated as a delta function for simpler calculation:

$$I(z,t) \approx k \cdot \delta(z - z_0(t)) \qquad (9)$$

Two examples of the spatial filter are shown in FIG. 10.

FIG. 10 shows diagrams of examples for a spatial filter design. Two examples of spatial filters were placed at image plane. The top two and bottom two long slits with dimensions of 10 μm by 200 μm are for speed detection. The other pinholes on the spatial filter are 10 μm by 20 μm (left) and 10 μm by 10 μm (right), for 3D image capturing with voxel size of 2 μm and 1 μm in x-direction, respectively. The arrangement of pinholes aligns the laser beam-waist.

Putting the slits used for speed detection aside, the characteristic function F(x, y) of the spatial filter is designed to be $$F(x, y) = \sum_{q=1}^{N} \delta(x - x_q) \cdot \delta(y - y_q) \qquad (10)$$

where q=1, 2, . . . , N is the number of pinholes on the spatial filter. The size of the pinhole, together with the NA of detection objective lens, the cell flowing speed, and signal sampling rate determine the spatial resolution in x- and y-directions.

In the example implementations, the spatial filters were fabricated using electron beam lithography and the blackout area is made of chromium with a thickness of 250 nm.

With the approximations above, when $y_{q+1} - y_q$ is larger than cell size (diameter), and cell projection is overlapped with j-th pinhole, $$S(t) = \int C(x, y - Mv_C t, z_0(t)) \delta(x - x_q) \delta(y - y_q) dx dy = \qquad (11)$$
$$C(x_j, y_j - Mv_C t, z_0(t))$$

Using a 10×/0.28 detection objective lens and presuming cell is within the depth of field, and the example system PSF at multiple z was not considered. The light intensity signal detected by PMT (Hamamatsu) was first amplified by an amplifier (Hamamatsu) with a bandwidth from DC to 150 MHz, and then digitized by a digitizer (ADVANTECH) with a maximum sampling rate of 125 MS/s per channel.

Consequently, this example approach maps the 3D cell image into the time-domain light intensity on a one-to-one basis. The 3D image construction algorithm was written in MATLAB according to the equations above. Due to slight variance in flowing speed $v_C$ of cells, the original size of the 3D image of each cell can be slightly different. In the example implementations, the original 3D image was then resized to 100×100×100 pixels. 3D image batch processing was performed in ImageJ.

Figure 11:
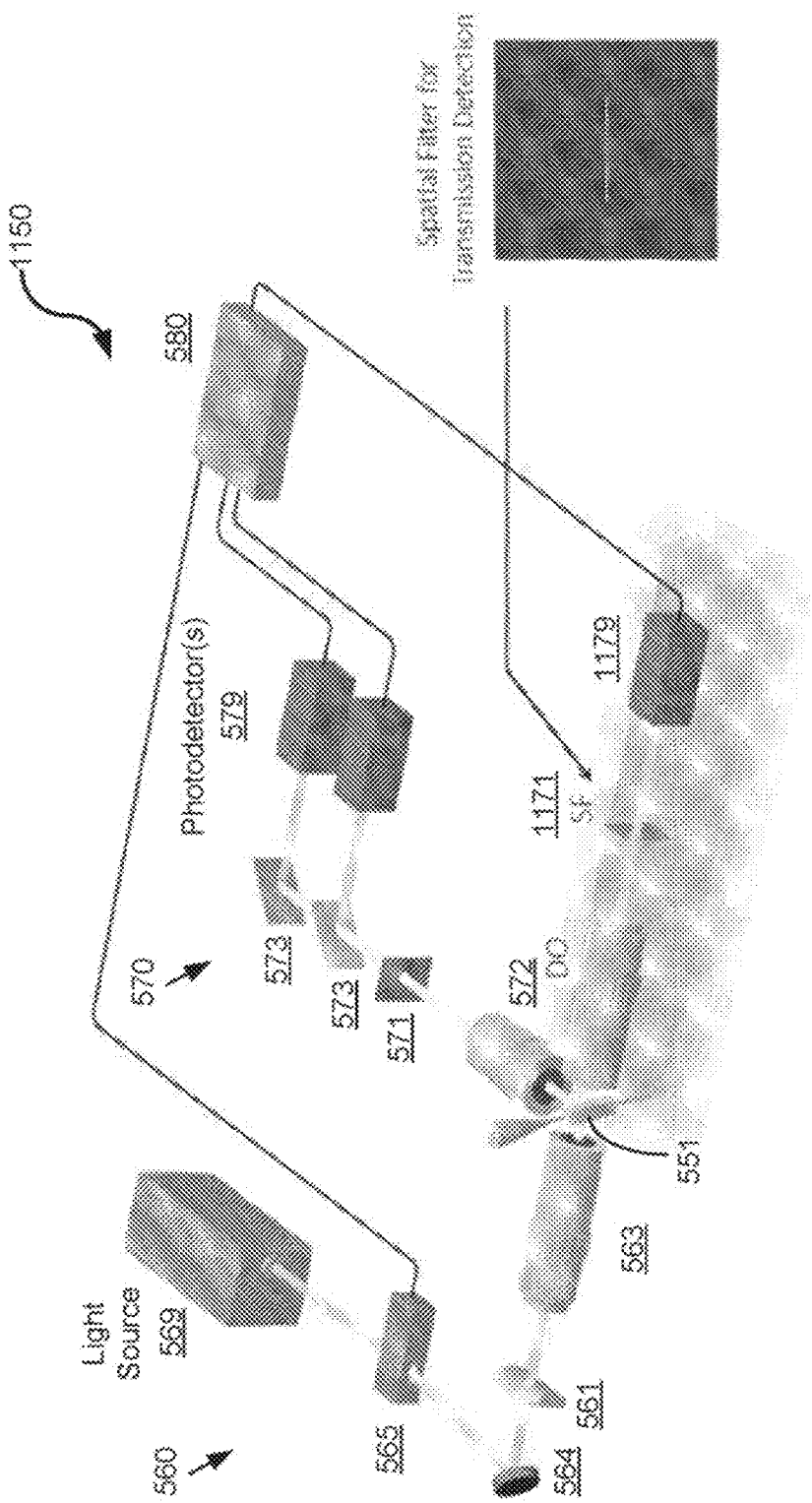
FIG. 11 shows a diagram of an example embodiment of a 3D-IFC system in accordance with the present technology.

FIG. 11 shows another example embodiment of a 3D-IFC system, labeled 1150, in accordance with some embodiments of the 3D-IFC system 550. The 3D-IFC system 1150 includes an additional detection path, e.g., providing a 2D transmission imaging mode. As shown in the diagram, the shadowed part (bottom right portion of the diagram) depicts the components of the transmission image detection; which includes a spatial filter 1171 for transmission detection having single slit (e.g., with dimensions of 50 μm by 2 mm), as well as a detection objective lens (DO) 572 (e.g., 50×/0.55 detection objective lens), and photodetector 1172 (e.g., PMT, photomultiplier tube), in data communication with the data processing system (e.g., DIG 580).

Example methods for preparing the cells is described below.

Cell with Fluorescent Beads. In some example implementations, the human embryonic kidney 293 (HEK-293) cells were cultured with complete culture media (DMEM, 10% Fetal Bovine Serum, 1% Penicillin Streptomycin) to 90% confluency in 10 cm petri dish. After 100× dilution of the 1.0 μm fluorescent beads (Ex/Em: 488/645 nm, e.g., T8883, ThermoFisher) from the stock solution (2% solids), 100 μL of the diluted solution was mixed with 10 mL fresh cell culturing media and added to cell culturing plate. After continuous culturing for 10 hours, the HEK-293 cells were harvested and stained with CellTrace CFSE cell proliferation kit (Ex/Em: 492/517 nm, e.g., C34554, ThermoFisher) at a working concentration of 20 μM. After the staining process, cells were fixed by 4% paraformaldehyde, washed and resuspended in 1× phosphate buffered saline (PBS). Before every imaging experiment, the cell suspension was diluted in PBS to a concentration of 1000 cells/μL.

CFSE Staining. In some example implementations, the HEK-293 cells may be cultured with complete culture media to 98% confluency in 10 cm petri dish, and then were harvested and resuspended to a concentration of 1×10⁶ cells/mL in 1×PBS. The CFSE Cell Proliferation Kit (Ex/Em 492/517 nm, e.g., C34554, Thermo Fisher) were added to the cell suspension at a working concentration of 20 μM. After incubating the cells at 37° C. for 30 minutes, fresh culture media (DMEM) were used to quench the staining process and the HEK-293 cells were washed by 1×PBS and fixed by 4% paraformaldehyde. The fixed cells were washed and resuspended in 1×PBS. Protocol was also applied to stain CMK3 cells and human blood leukocytes.

CMK3 Cell Irradiation Treatment and Immunostaining. In some example implementations, the human glioblastoma CMK3 cells were cultured with complete culture media (DMEM-F12, 2% B27 supplement, 1% Penicillin Streptomycin, 1% Glutamax, 100 μg/L EGF, 100 μg/L FGF, 0.24% Heparin) in culture plates. The cells were harvested and resuspended to a concentration of 1×10⁶ cells/mL in 1×PBS, and then stained with CFSE. To induce DNA double-strand breaks (DSB), CMK3 cells are treated with 6 Gy irradiation by cesium source irradiator. The treated cells were washed once with 1×PBS and fixed with 1% paraformaldehyde 30 minutes post irradiation. The fixed cells were washed with PBS twice. Then 70% ethanol was added to the cells and the cells were incubated on ice for 1 hour. After ethanol treatment, cells were washed with PBS twice and incubated in 1% TritonX-100 at room temperature for 10 minutes. Then, cells were washed with PBS once and incubated in 5% Bovine Serum Albumin (BSA) in PBS for 30 minutes at room temperature on shaker. Cells were then washed with PBS once and incubated in anti-phospho-histone H2A.X (Ser139) Antibody, clone JBW301 at 1:300 dilution on ice on shaker for 1 hour. After the primary antibody treatment, cells were washed twice with 5% BSA and incubated in PerCP/Cy5.5 anti-mouse IgG1 Antibody at 1:100 dilution on ice on shaker for 1 hour. At last, the stained cells were washed twice with 5% BSA and resuspended in 1:3 diluted stabilizing fixative buffer in MilliQ water. Before every imaging experiment, the cells ware diluted in PBS to a concentration of 500 cells/μL.

Leukocytes Separation and staining. In some example implementations, the fresh human whole blood was harvested in EDTA tube from San Diego Blood Bank. The red blood cells in the whole blood were first lysed by RBC lysis buffer (00-4300-54, Invitrogen) and the leukocytes population was harvested by soft centrifuge after the lysing process. The harvested leukocytes were then washed and resuspended to a concentration of $1 \times 10^6$ cells/mL in 1×PBS. The resuspended leukocytes were stained with CFSE. After the staining process, the cells were fixed by 4% paraformaldehyde, washed and resuspended in 1×PBS. Before every imaging experiment, the cell suspension was diluted in PBS to a concentration of 500 cells/μL.

As demonstrated by the example data, the disclosed 3D-IFC system is able to provide an unprecedented access to high-throughput 3D image capture and analysis. The example implementations of the 3D-IFC system 550 featured a cell flow speed of 0.2 m s$^{-1}$, a spatial resolution of 1 μm in thee axes, a field of view of 20 μm in all axes, and a throughput of 500 cells per second. Some embodiments have the flexibility to directly increase the spatial resolution, field of view and 3D image capture rate through the change of spatial filter and the use of higher flow rate. Its information-rich 3D dark-field (side-scattering) image detection, coupled with 2D transmission image, offers possibilities for label-free assays.

Example applications of the disclosed systems, methods and devices include, but are not limited to, asymmetric division of T-cells into effector and memory cells, the secretory pathway of B cells, phenotype drug discovery, protein or receptor translocations, tracking of organelle formation or trafficking, and chromosome structural aberrations, where 3D orientation and polarity are important, and other applications. In some implementations, the disclosed systems, methods and devices can be integrated with image-based sorting functionality.

EXAMPLES

In some embodiments in accordance with the present technology (example A1), a three-dimensional imaging flow cytometry system includes a particle flow system; a scanning light-sheet illumination system interfaced with the particle flow system; an optical detection system interfaced with the particle flow system; and a data processing system in communication with the optical detection system and/or scanning light-sheet illumination system. The particle flow system includes a fluidic channel with clear optical paths carrying a fluid sample containing a particle; and a flow focusing system to produce confined sample fluid to a fine stream in the fluidic channel. The scanning light-sheet illumination system includes a light source to illuminate the particle flowing in the fluidic channel; a device to redirect an illumination beam to different angles, which is programmable to generate periodic angle change at high speed; and a cylindrical lens and/or other optical components to produce a structured light-sheet illumination that allows optical scanning of illuminated sections of the particle at a time, such as a thin slice or a thin line of the particle. The optical detection system includes one or more photodetectors and a spatial filter positioned at the image plane of the one or more photodetectors to selectively allow light from specific position of the particle to pass through and be detected by the one or more photodetectors. The data processing system is configured to process the detected data and produce a three-dimensional constructed image of the particle.

Example A2 includes the system of any of examples A1 or A3-A7, in which the optical detection system is operable to collect and detect fluorescence and/or scattering light.

Example A3 includes the system of any of examples A1-A2 or A4-A7, in which the optical detection system is configured to be placed at any angle that the fluidic channel has an optically clear path.

Example A4 includes the system of any of examples A1-A3 or A5-A7, in which the optical detection system is operable to detect 1D optical data points in time of a 3D objection based on combination of (a) flow motion of the particle, (b) a scanning light-sheet illumination, and (c) spatially mapped filter to detect light intensity (e.g., including fluorescence and scattering) from every position of the particle in a sequentially-timed manner, such that the time-domain signal recorded by the one or more photodetectors has a one-to-one relation from space to time.

Example A5 includes the system of any of examples A1-A4 or A6-A7, in which the data processing system includes a data streaming unit in communication with the optical detection system.

Example A6 includes the system of any of examples A1-A5 or A7, in which the data processing system includes an image reconstruction algorithm that includes specifications of illumination and detection protocols and commands the scanning light-sheet illumination system and the optical detection system accordingly.

Example A7 includes the system of any of examples A1-A6, in which the data processing system includes an image processing unit to process the image data to determine properties associated with the particle.

In some embodiments in accordance with the present technology (example B1), an optical imaging system for three dimensional imaging in a flow cytometry system includes a light source to illuminate a particle flowing in a flow channel; one or more lenses configured above a region of the flow channel; an acousto-optic deflector configured in an optical path of the optical photodetector and light source to provide high-speed scanning in a z-direction; and a single-element photodetector to detect fluorescence passed a spatial filter in each channel, in which the light source is configured to illuminate the particle flowing in the flow channel in a single plane at a time while a signal is detected in a perpendicular direction.

Example B2 includes the optical imaging system of example B1, wherein the system is configured to obtain optical signal data to reconstruct an image from time-domain detector output based on a combination of a scanned light sheet, the flow motion of the particle, and the spatial filter, such that the photodetector detects an individual point in the particle at a time, thereby allowing spatial-to-temporal transformation.

Example B3 includes the optical imaging system of example B1, wherein the light source includes a laser.

In some embodiments in accordance with the present technology (example B4), a three-dimensional imaging flow cytometry system includes a particle flow device structured to include a substrate, a channel formed on the substrate operable to flow particles including living cells along a flow direction of the channel; an imaging system interfaced with the particle flow device and operable to obtain image data in three dimensions associated with a particle during flow through the channel; and a data processing and control unit in communication with the imaging system, the data processing and control unit including a processor configured to process the image data obtained by the imaging system to determine one or more properties associated with the cell from the processed image data, in which the imaging system is configured in a light sheet fluorescence microscopy configuration, which illuminates a specimen in a single plane at a time whilst the signal is detected in a perpendicular direction.

Example B5 includes the three-dimensional imaging flow cytometry system of example B4, wherein the imaging system includes the optical imaging system of any of examples B1-B3.

Example B6 includes the three-dimensional imaging flow cytometry system of example B4, wherein the imaging system includes one or more light sources to provide an input light at a region of the particle flow device, and an optical photodetector to capture the image data from the particle illuminated by the input light.

Example B7 includes the three-dimensional imaging flow cytometry system of example B6, wherein the optical photodetector includes an objective lens of a microscope optically coupled to a spatial filter, an emission filter, and a photomultiplier tube.

Example B8 includes the three-dimensional imaging flow cytometry system of example B7, wherein the optical photodetector further includes one or more light guide elements to direct the input light at the first region, to direct light emitted or scattered by the cell to an optical element of the optical photodetector, or both.

Example B9 includes the three-dimensional imaging flow cytometry system of example B8, wherein the light guide element includes a dichroic mirror.

Example B10 includes the three-dimensional imaging flow cytometry system of example B8, wherein the optical photodetector includes two or more photomultiplier tubes to generate two or more corresponding signals based on two or more bands or types of light emitted or scattered by the cell.

In some embodiments in accordance with the present technology (example C1), a three-dimensional (3D) imaging flow cytometry system includes a particle flow device including a substrate and a channel formed on the substrate to allow particles in a fluid to flow along a flow direction of the channel; an optical illumination system to produce a two-dimensional (2D) sheet of light that scans over a plurality of sections of a particle in the fluid, one section at a time, while the particle is flowing along the flow direction in the channel, the optical illumination system including a light source to produce a light beam that is optically coupled to a light-sheet generation unit to modify the light beam into the 2D sheet of light directed at the channel, wherein the light-sheet generation unit includes a light redirection device to redirect the light beam to different angles and a cylindrical lens placed after the light redirection device in an optical path with the channel; an optical detection system interfaced with the particle flow device and operable to obtain optical signal data in three dimensions associated with the particle during flow through the channel, wherein the optical detection system includes one or more photodetectors and a spatial filter positioned at an image plane of the one or more photodetectors, the spatial filter including a plurality of apertures to selectively allow a portion of the 2D sheet of light over a scanned section of the particle to pass through the spatial filter and be detected by the one or more photodetectors; and a data processing unit in communication with the optical detection system and the optical illumination system, the data processing unit including a processor configured to process the optical signal data obtained by the optical detection system and produce image data from which a 3D image of the particle can be constructed.

Example C2 includes the system of any of examples C1 or C3-C15, wherein the 2D sheet of light is directed at the channel in a second direction perpendicular to the flow direction, such that a first scan of the 2D sheet of light forms a first plane comprising the flow direction and the second direction; and wherein the image plane of the optical detection system is arranged along a third direction perpendicular to the flow direction and the second direction, such that a second scan of the 2D sheet of light forms a second plane parallel with the first plane and varied by a distance from the first plane along the third direction.

Example C3 includes the system of example C2, wherein the optical illumination system is configured to scan, while the particle is flowing in the flow direction, a first section of the particle in the first plane at a first time point and to scan a second section of the particle in the second plane at a second time point, thereby producing a temporal signal that spatially maps to the particle.

Example C4 includes the system of example C2, wherein the apertures of the spatial filter are positioned along the second direction such that each aperture is configured to filter the 2D sheet of light to correspond to a voxel of the particle.

Example C5 includes the system of any of examples C1-C4 or C6-C15, wherein the data processing unit is operable produce the 3D image of the particle, voxel-by-voxel.

Example C6 includes the system of any of examples C1-05 or C7-C15, wherein the image data of the particle includes a spatial resolution of at least 1 μm in three axes and a field of view of 20 μm in the three axes.

Example C7 includes the system of any of examples C1-C6 or C8-C15, wherein a flow rate of the particles in the channel is at least 0.2 m s$^{-1}$, and wherein the system is operable to produce the image data of the particles at a throughput of 500 particles per second.

Example C8 includes the system of any of examples C1-C7 or C9-C15, wherein the plurality of apertures of the spatial filter are arranged in a pattern, wherein each aperture of the pattern is evenly spaced along the flow direction and varies in its position along a second direction perpendicular to the flow direction with respect to another aperture of the pattern.

Example C9 includes the system of any of examples C1-C8 or C10-C15, wherein the light redirection device includes an acousto-optic deflector (AOD).

Example C10 includes the system of any of examples C1-C9 or C11-C15, wherein the light-sheet generation unit is programmable, by the data processing unit, to generate a periodic angle change at a speed of at least 200 kHz.

Example C11 includes the system of any of examples C1-C10 or C12-C15, wherein the one or more photodetectors includes a photomultiplier tube.

Example C12 includes the system of any of examples C1-C11 or C13-C15, wherein the optical detection system includes an objective lens optically coupled to the spatial filter, and an emission filter optically coupled between the spatial filter and the photodetector.

Example C13 includes the system of example C12, wherein the optical detection system further includes one or more light guide elements to direct the light out of the spatial filter at toward multiple photodetectors.

Example C14 includes the system of example C13, wherein the optical detection system includes two or more photomultiplier tubes to generate two or more corresponding signals based on two or more bands or types of light emitted or scattered by the cell.

Example C15 includes the system of any of examples C1-C14, wherein the particles include living cells.

In some embodiments in accordance with the present technology (example C16), a method for three-dimensional (3D) imaging of moving particles includes moving a particle through a channel along a first direction; scanning a plurality of sections of the particle, section by section, by directing individual two-dimensional (2D) sheets of light at corresponding regions of the channel while the particle is moving through the channel; spatially filtering portions of the 2D sheets of light over the scanned sections of the particle to allow certain optical point signals through a spatial filter to be detected; detecting the spatially-filtered optical point signals corresponding to individual voxels in three dimensions mapped to time points of detection; and processing the optical point signals to produce image data of the particle.

Example C17 includes the method of any of examples C16 or C18-C24, comprising modifying a light beam produced from a light source into the individual 2D sheets of light.

Example C18 includes the method of example C17, wherein the scanning the plurality of sections of the particle includes redirecting the light beam to different angles through a cylindrical lens that modifies a redirected light beam into a 2D sheet of light.

Example C19 includes the method of any of examples C16-C18 or C20-C24, wherein a first individual 2D sheet of light is directed at the channel in a second direction perpendicular to the first direction, such that a first scan of the 2D sheet of light forms a first plane comprising the first direction and the second direction; and wherein an image plane for the detecting is arranged along a third direction perpendicular to the first direction and the second direction, such that a second scan of a second individual 2D sheet of light forms a second plane parallel with the first plane and varied by a distance from the first plane along the third direction.

Example C20 includes the method of any of examples C16-C19 or C21-C24, comprising producing a 3D image of the particle based on a voxel-by-voxel construction from the produced image data.

Example C21 includes the method of any of examples C16-C20 or C22-C24, wherein the image data of the particle includes a spatial resolution of at least 1 µm in three axes and a field of view of 20 µm in the three axes.

Example C22 includes the method of any of examples C16-C21 or C22-C24, wherein the image data of the particles is produced at a throughput of 500 particles per second.

Example C23 includes the method of any of examples C16-C22 or C24, wherein the particles include living cells.

Example C24 includes the method of any of examples C16-C23 implemented on the system of any of examples C1-C15.

In some embodiments in accordance with the present technology (example D1), a system for three-dimensional (3D) imaging of moving particles includes a particle motion device including a substrate to allow particles to move along a travel path in a first direction; an optical illumination system to produce an asymmetric illumination area of light in a region of the travel path of a particle that scans over a plurality of sections of the particle at multiple time points while the particle is moving, the asymmetric illumination area of light comprising one dimension of illumination thinner than the other dimension of illumination to form a shape like an illumination plane, the optical illumination system including a light source to produce a light beam that is optically coupled to light redirection device to modify the light beam by redirecting the light beam to different angles to have the asymmetric illumination area of light directed at the travel path of particle motion; an optical detection system optically interfaced with the particle motion device and operable to obtain optical signal data associated with different parts of the particle corresponding to the particle's volume during motion in the travel path, wherein the optical detection system includes one or more photodetectors and a spatial filter positioned between the particle motion device and the one or more photodetectors, the spatial filter including a plurality of apertures to selectively allow a portion of the asymmetric illumination area of light over a scanned section of the particle to pass through the spatial filter and be detected by the one or more photodetectors; and a data processing unit in communication with the optical detection system, the data processing unit including a processor configured to process the optical signal data obtained by the optical detection system and produce data including information indicative of 3D features of the particle.

Example D2 includes the system of any of examples D1 or D3-D20, wherein the asymmetric illumination area of light is directed at the region of the travel path in a second direction perpendicular to the first direction, such that a first scan of the asymmetric illumination area of light forms a first plane comprising the first direction and the second direction; and wherein the image plane of the optical detection system is arranged along a third direction perpendicular to the first direction and the second direction, such that a second scan of the asymmetric illumination area of light forms a second plane parallel with the first plane and varied by a distance from the first plane along the third direction.

Example D3 includes the system of example D2 or D4, wherein the optical illumination system is configured to scan, while the particle is moving in the first direction, a first section of the particle in the first plane at a first time point and to scan a second section of the particle in the second plane at a second time point, thereby producing a temporal signal that spatially maps to the particle.

Example D4 includes the system of example D2 or D3, wherein the apertures of the spatial filter are positioned along the second direction such that each aperture is configured to filter the asymmetric illumination area of light to correspond to a voxel of the particle.

Example D5 includes the system of any of examples D1-D4 or D6-D20, wherein the data processing unit is operable produce a 3D image of the particle, voxel-by-voxel.

Example D6 includes the system of example D5, wherein the 3D image data of the particle includes a spatial resolution of at least 1 µm in three axes and a field of view of about 20 µm in the three axes.

Example D7 includes the system of any of examples D1-D6 or D8-D20, wherein the particle motion device includes a particle flow cell including a channel formed on the substrate to allow a fluid containing the particles to flow through the channel as the travel path.

Example D8 includes the system of example D7, wherein a flow rate of the particles in the channel is at least 0.2 m s$^{-1}$, and wherein the system is operable to produce the data of the particles at a throughput of 500 particles per second.

Example D9 includes the system of any of examples D1-D8 or D10-D20, wherein the particles are fixed to the substrate, and wherein the particle motion device includes a positioning system to move the substrate with respect to the optical illumination system and the optical detection system such that the particle is moved along the travel path and brought into the region upon which the asymmetric illumination area of light is scanned.

Example D10 includes the system of any of examples D1-D9 or D11-D20, wherein the plurality of apertures of the spatial filter are arranged in a pattern, wherein each aperture of the pattern is spaced along the first direction and varies in its position along a second direction perpendicular to the first direction with respect to another aperture of the pattern.

Example D11 includes the system of any of examples D1-D10 or D12-D20, wherein the light redirection device includes an acousto-optic deflector (AOD).

Example D12 includes the system of example D11, wherein the AOD is programmable, by the data processing unit, to generate a periodic angle change at a speed of at least 100 kHz.

Example D13 includes the system of any of examples D1-D12 or D14-D20, wherein the light redirection device includes a multiplexed array of scanning mirrors and/or a multiplexed array of scanning gratings.

Example D14 includes the system of any of examples D1-D13 or D15-D20, wherein the light redirection device is optically coupled with one or more passive optical components, selected from a group consisting of a cylindrical lens, a lens, a prism, and a spatial filter, to shape the redirected light on the travel path.

Example D15 includes the system of any of examples D1-D14 or D16-D20, wherein the one or more photodetectors includes a photomultiplier tube.

Example D16 includes the system of any of examples D1-D15 or D17-D20, wherein the optical detection system further includes an objective lens optically coupled with the light redirection device.

Example D17 includes the system of any of examples D1-D16 or D18-D20, wherein the optical detection system includes an objective lens optically coupled to the spatial filter.

Example D18 includes the system of any of examples D1-D17 or D19-D20, wherein the optical detection system further includes one or more light guide elements to direct the light out of the spatial filter toward multiple photodetectors.

Example D19 includes the system of example D18, wherein the optical detection system further includes two or more photodetectors to generate two or more corresponding signals based on two or more bands or types of light emitted or scattered by the cell.

Example D20 includes the system of any of examples D1-D19, wherein the particles include living cells.

In some embodiments in accordance with the present technology (example D21), a method for three-dimensional (3D) imaging of moving particles includes moving a particle along a first direction; scanning a plurality of sections of the particle, section by section, by directing individual asymmetric illumination areas of light at corresponding regions while the particle is moving; spatially filtering portions of the asymmetric illumination area of light over the scanned sections of the particle in motion to allow certain optical signals corresponding to the particle's volume through a spatial filter to be detected; and detecting the spatially-filtered optical signals to obtain individual voxels in three dimensions mapped to time points of detection.

Example D22 includes the method of any of examples D21 or D23-D32, comprising modifying a light beam produced from a light source into the individual asymmetric illumination areas of light.

Example D23 includes the method of any of examples D21-D22 or D24-D32, wherein the scanning the plurality of sections of the particle includes redirecting the light beam to different angles and shaping the redirected light beam into the asymmetric illumination areas of light.

Example D24 includes the method of any of examples D21-D23 or D25-D32, wherein a first individual asymmetric illumination area of light is directed at a travel path of the particle in a second direction perpendicular to the first direction, such that a first scan of the first individual asymmetric illumination area of light forms a first plane comprising the first direction and the second direction; and wherein an image plane for the detecting is arranged along a third direction perpendicular to the first direction and the second direction, such that a second scan of a second individual asymmetric illumination area of light forms a second plane parallel with the first plane and varied by a distance from the first plane along the third direction.

Example D25 includes the method of any of examples D21-D24 or D26-D32, further comprising processing the optical signals to produce data including information indicative of 3D features of the particle.

Example D26 includes the method of any of examples D21-D25 or D27-D32, comprising producing a 3D image of the particle based on a voxel-by-voxel construction from the produced data.

Example D27 includes the method of any of examples D21-D26 or D28-D32, wherein the data of the particle includes a spatial resolution of at least 1 μm in three axes and a field of view of 20 μm in the three axes.

Example D28 includes the method of any of examples D21-D27 or D29-D32, wherein the data of the particles is produced at a throughput of 500 particles per second.

Example D29 includes the method of any of examples D21-D28 or D30-D32, wherein the particle is moved by a particle flow cell including a channel formed on a substrate to flow a fluid containing the particle through the channel along the first direction.

Example D30 includes the method of any of examples D21-D29 or D31-D32, wherein the particle is fixed to a substrate, and the substrate is moved by a positioning system, such that the particle moves along the first direction on the substrate.

Example D31 includes the method of any of example D21-D30 or D32, wherein the particles include living cells.

Example D32 includes the method of any of examples D21-D31 implemented on the system of any of examples D1-D20.

Implementations of the subject matter and the functional operations described in this patent document and attached appendices can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

The term "about," as used herein when referring to a measurable value such as an amount or concentration and the like, is meant to encompass variations of 20%, 10%, 5%, 1%, 0.5%, or even 0.1% of the specified amount.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document and attached appendices contain many specifics, these should not be construed as limitations on the scope of any invention or of what may be claimed, but rather as descriptions of features that may be specific to particular embodiments of particular inventions. Certain features that are described in this patent document and attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated in this patent document and attached appendices.

What is claimed is:

1. A system for three-dimensional (3D) imaging of moving particles, comprising:
a particle motion device including a substrate to allow particles to move along a travel path in a first direction;
an optical illumination system to produce an asymmetric illumination area of light in a region of the travel path of a particle that scans over a plurality of sections of the particle at multiple time points while the particle is moving, the asymmetric illumination area of light comprising one dimension of illumination thinner than the other dimension of illumination to form a shape like an illumination plane, the optical illumination system including a light source to produce a light beam that is optically coupled to light redirection device to modify the light beam by redirecting the light beam to different angles to have the asymmetric illumination area of light directed at the travel path of particle motion;
an optical detection system optically interfaced with the particle motion device and operable to obtain optical signal data associated with different parts of the particle corresponding to the particle's volume during motion in the travel path, wherein the optical detection system includes one or more photodetectors and a spatial filter positioned between the particle motion device and the one or more photodetectors, the spatial filter including a plurality of apertures to selectively allow a portion of the asymmetric illumination area of light over a scanned section of the particle to pass through the spatial filter and be detected by the one or more photodetectors; and a data processing unit in communication with the optical detection system, the data processing unit including a processor configured to process the optical signal data obtained by the optical detection system and produce data including information indicative of 3D features of the particle.

2. The system of claim 1, wherein the asymmetric illumination area of light is directed at the region of the travel path in a second direction perpendicular to the first direction, such that a first scan of the asymmetric illumination area of light forms a first plane comprising the first direction and the second direction; and wherein the image plane of the optical detection system is arranged along a third direction perpendicular to the first direction and the second direction, such that a second scan of the asymmetric illumination area of light forms a second plane parallel with the first plane and varied by a distance from the first plane along the third direction.

3. The system of claim 2, wherein the optical illumination system is configured to scan, while the particle is moving in the first direction, a first section of the particle in the first plane at a first time point and to scan a second section of the particle in the second plane at a second time point, thereby producing a temporal signal that spatially maps to the particle.

4. The system of claim 2, wherein the apertures of the spatial filter are positioned along the second direction such that each aperture is configured to filter the asymmetric illumination area of light to correspond to a voxel of the particle.

5. The system of claim 1, wherein the data processing unit is operable produce a 3D image of the particle, voxel-by-voxel.

6. The system of claim 5, wherein the 3D image data of the particle includes a spatial resolution of at least 1 μm in three axes and a field of view of about 20 μm in the three axes.

7. The system of claim 1, wherein the particle motion device includes a particle flow cell including a channel formed on the substrate to allow a fluid containing the particles to flow through the channel as the travel path.

8. The system of claim 7, wherein a flow rate of the particles in the channel is at least 0.2 m s$^{-1}$, and wherein the system is operable to produce the data of the particles at a throughput of 500 particles per second.

9. The system of claim 1, wherein the particles are fixed to the substrate, and wherein the particle motion device includes a positioning system to move the substrate with respect to the optical illumination system and the optical detection system such that the particle is moved along the travel path and brought into the region upon which the asymmetric illumination area of light is scanned.

10. The system of claim 1, wherein the plurality of apertures of the spatial filter are arranged in a pattern, wherein each aperture of the pattern is spaced along the first direction and varies in its position along a second direction perpendicular to the first direction with respect to another aperture of the pattern.

11. The system of claim 1, wherein the light redirection device includes an acousto-optic deflector (AOD).

12. The system of claim 11, wherein the AOD is programmable, by the data processing unit, to generate a periodic angle change at a speed of at least 100 kHz.

13. The system of claim 1, wherein the light redirection device includes a multiplexed array of scanning mirrors and/or a multiplexed array of scanning gratings.

14. The system of claim 11, wherein the light redirection device is optically coupled with one or more passive optical components, selected from a group consisting of a cylindrical lens, a lens, a prism, and a spatial filter, to shape the redirected light on the travel path.

15. The system of claim 1, wherein the one or more photodetectors includes a photomultiplier tube.

16. The system of claim 1, wherein the optical detection system further includes an objective lens optically coupled with the light redirection device.

17. The system of claim 1, wherein the optical detection system includes an objective lens optically coupled to the spatial filter.

18. The system of claim 1, wherein the optical detection system further includes one or more light guide elements to direct the light out of the spatial filter toward multiple photodetectors.

19. The system of claim 18, wherein the optical detection system further includes two or more photodetectors to generate two or more corresponding signals based on two or more bands or types of light emitted or scattered by the cell.

20. The system of claim 1, wherein the particles include living cells.

21. A method for three-dimensional (3D) imaging of moving particles, comprising:
moving a particle along a first direction;
scanning a plurality of sections of the particle, section by section, by directing individual asymmetric illumination areas of light at corresponding regions while the particle is moving;
spatially filtering portions of the asymmetric illumination area of light over the scanned sections of the particle in motion to allow certain optical signals corresponding to the particle's volume through a spatial filter to be detected; and
detecting the spatially-filtered optical signals to obtain individual voxels in three dimensions mapped to time points of detection.

22. The method of claim 21, comprising:
modifying a light beam produced from a light source into the individual asymmetric illumination areas of light.

23. The method of claim 22, wherein the scanning the plurality of sections of the particle includes redirecting the light beam to different angles and shaping the redirected light beam into the asymmetric illumination areas of light.

24. The method of claim 21, wherein a first individual asymmetric illumination area of light is directed at a travel path of the particle in a second direction perpendicular to the first direction, such that a first scan of the first individual asymmetric illumination area of light forms a first plane comprising the first direction and the second direction; and wherein an image plane for the detecting is arranged along a third direction perpendicular to the first direction and the second direction, such that a second scan of a second individual asymmetric illumination area of light forms a second plane parallel with the first plane and varied by a distance from the first plane along the third direction.

25. The method of claim 21, further comprising:
processing the optical signals to produce data including information indicative of 3D features of the particle.

26. The method of claim 25, comprising producing a 3D image of the particle based on a voxel-by-voxel construction from the produced data.

27. The method of claim 25, wherein the data of the particle includes a spatial resolution of at least 1 μm in three axes and a field of view of 20 μm in the three axes.

28. The method of claim 25, wherein the data of the particles is produced at a throughput of 500 particles per second.

29. The method of claim 21, wherein the particle is moved by a particle flow cell including a channel formed on a substrate to flow a fluid containing the particle through the channel along the first direction.

30. The method of claim 21, wherein the particle is fixed to a substrate, and the substrate is moved by a positioning system, such that the particle moves along the first direction on the substrate.

31. The method of claim 21, wherein the particles include living cells.

* * * * *